(12) United States Patent
Spiesberger

(10) Patent No.: US 10,929,506 B1
(45) Date of Patent: Feb. 23, 2021

(54) COMPUTERIZED ESTIMATION OF MINIMUM NUMBER OF SONIC SOURCES USING ANTICHAIN LENGTH

(71) Applicant: Scientific Innovations, Inc., Radnor, PA (US)

(72) Inventor: John Louis Spiesberger, Radnor, PA (US)

(73) Assignee: Scientific Innovations, Inc., Radnor, PA (US)

( * ) Notice: Subject to any disclaimer, the term of this patent is extended or adjusted under 35 U.S.C. 154(b) by 0 days.

(21) Appl. No.: 16/941,283

(22) Filed: Jul. 28, 2020

Related U.S. Application Data

(60) Provisional application No. 63/033,711, filed on Jun. 2, 2020.

(51) Int. Cl.
*G06K 9/00* (2006.01)
*G06F 17/18* (2006.01)
*G06K 9/62* (2006.01)
*A01K 61/90* (2017.01)
*G01V 1/00* (2006.01)

(52) U.S. Cl.
CPC .............. *G06F 17/18* (2013.01); *A01K 61/90* (2017.01); *G01V 1/001* (2013.01); *G06K 9/6267* (2013.01)

(58) Field of Classification Search
CPC combination set(s) only.
See application file for complete search history.

(56) References Cited

U.S. PATENT DOCUMENTS

| | | | |
|---|---|---|---|
| 7,219,032 B2 | 5/2007 | Spiesberger | |
| 7,363,191 B2 * | 4/2008 | Spiesberger | .............. G01S 5/02 702/142 |
| 8,010,314 B2 | 8/2011 | Spiesberger | |
| 8,311,773 B2 | 11/2012 | Spiesberger | |
| 8,639,469 B2 | 2/2014 | Spiesberger | |
| 10,379,218 B1 * | 8/2019 | Spiesberger | ............ G01S 15/58 |

(Continued)

OTHER PUBLICATIONS

Buckland, S.T. et al; Distance Sampling: Estimating Abundance of Biological Populations; Biometrics 50; Chapman and Hall, London; 1993.

(Continued)

*Primary Examiner* — Alex Kok S Liew
(74) *Attorney, Agent, or Firm* — Louis Hoffman; David Alavi

(57) ABSTRACT

A computerized machine (a) determines temporal and spatial statistical characterizations for each one of plural sonic events, (b) classifies certain pairings among the sonic events as comparable, and (c) estimates a minimum number of sonic sources, some of which are in motion, that could have generated the sonic events. Sonic event times and positions can be characterized by corresponding temporal and spatial confidence intervals. A pairing of sonic events is classified as comparable only when that pairing meets one or more preselected constraints, some of which depend on the temporal and spatial statistical characterizations. The estimated minimum number of sonic sources is equal to the number of sonic events in a longest antichain within a chronological ordering of the set of sonic events. An antichain comprises a subset of the sonic events for which no pairing of sonic events of that subset is a comparable pairing.

22 Claims, 7 Drawing Sheets

| Call | X(m) | Y(m) | t(s) |
|---|---|---|---|
| 1 | 2375.4 | 4534.5 | 0 |
| 2 | 8242.8 | 6090.4 | 0 |
| 3 | 9657.5 | 7755.3 | 0 |
| 4 | 9726 | 6416.1 | 0 |
| 5 | 1702.1 | 4288.9 | 200 |
| 6 | 8300.9 | 6581 | 200 |
| 7 | 9958.4 | 7714.9 | 200 |
| 8 | 10005.7 | 7090.3 | 200 |
| 9 | -112.5 | 3731.8 | 400 |
| 10 | 8444.8 | 7998.1 | 400 |
| 11 | 11743.6 | 7222 | 400 |
| 12 | 10252.8 | 7470.1 | 400 |
| 13 | -543.5 | 3667.4 | 600 |
| 14 | 8446.3 | 8647.3 | 600 |
| 15 | 13067.5 | 6909.8 | 600 |
| 16 | 11176.8 | 8950.2 | 600 |
| 17 | -1144.7 | 3451.5 | 800 |
| 18 | 8420.9 | 9200.7 | 800 |
| 19 | 13540.9 | 6867.4 | 800 |
| 20 | 11285.4 | 9200.4 | 800 |
| 21 | -2924.9 | 3004.1 | 1000 |
| 22 | 8415.2 | 10591.6 | 1000 |
| 23 | 14678 | 6906.2 | 1000 |
| 24 | 11517.8 | 9612.1 | 1000 |

(56) References Cited

U.S. PATENT DOCUMENTS

2013/0272548 A1* 10/2013 Visser .................. G06K 9/4671 381/122

OTHER PUBLICATIONS

Cormen, Thomas H. et al.; Section 26.2: The FordFulkerson method; Introduction to Algorithms (Third Ed.), MIT Press; pp. 708-766; 2009.
Dufoss, Fanny et al; Approximation algorithms for maximum matchings in undirected graphs; CSC 2018—SIAM Workshop on Combinatorial Scientific Computing, Bergen, Norway; pp. 56-65; Jun. 2018.
Dilworth, R. P.; A Decomposition Theorem for Partially Ordered Sets; Annals of Mathematics, Second Series, vol. 51, No. 1; pp. 161-166; Jan. 1950.
Freese, Ralph et al.; Free Lattices; American Mathematical Society, vol. 42, p. 221-229; 1995.
NetworkX; documentation page at https://networkx.github.io/; Oct. 2019.
Gabow, Harold N.; The Weighted Matching Approach to Maximum Cardinality Matching; Fundamenta Informaticae, vol. 154, No. 1-4; Mar. 10, 2017.
Kuhn, H.W.; The Hungarian Method for the Assignment Problem, Naval Research Logistics Quarterly; vol. 2, Issue 1-2; Mar. 1955.
Mucha, Marcin and Sankowski, Piotr; Maximum Matchings via Gaussian Elimination; Proceedings of the 45th Annual IEEE Symposium on Foundations of Computer Science (FOCS'04), Rome, Italy; pp. 248-255; 2004.
Spiesberger, John L. et al; Reliable lower bound for number of calling marine mammals in Chukchi sea (Abstract); Journal of the Acoustical Society of America, 146, 2806; 2019.
Spiesberger, John L. et al; Locating and Censusing Calling Marine Mammals Amongst Black Holes (Abstract); Alaska Marine Science Symposium, Anchorage Alaska; Jan. 27-31, 2020.
Uno, Takeaki; Algorithms for Enumerating All Perfect, Maximum and Maximal Matchings in Bipartite Graphs, ISAAC 97: Proceedings of the 8th International Symposium on Algorithms and Computation; pp. 92-101; Dec. 1997.
Xu, Chi; EnumMatching; software download available at https://github.com/charlesxuuu/EnumMatching; May 2016.
Xu, Guangzhi; bipartite_matching; software download available at https://github.com/Xunius/bipartite_matching; Jun. 2017.
Raftery, Adrian E. and Zeh, Judith E.; Estimating Bowhead Whale Population Size and Rate of Increase from the 1993 Census; Journal of the American Statistical Association, vol. 93, No. 442, pp. 451-463; Jun. 1998.
Ikiz, S. and Garg, Vijay K.; Online Algorithms for Dilworth's Chain Partition; Parallel and Distributed Systems Laboratory, Dept. of Electrical and Computer Eng., The University of Texas at Austin, Austin TX 78712; 2004.
Jacoby, David M.P. and Freeman, Robin; Emerging Network-Based Tools in Movement Ecology; Trends in Ecology & Evolution, vol. 31; Apr. 2016.
Jacoby, David M.P. et al.; Developing a deeper understanding of animal movements and spatial dynamics through novel application of network analyses; Methods in Ecology and Evolution; British Ecological Society; 2012.
Jacoby, David M.P. et al.; Inferring animal social networks and leadership: applications for passive monitoring arrays; Journal of the Royal Society Interface 13; Nov. 2016.
Cheriyan, Joseph; Randomized $\tilde{O}(M^{|V|})$ Algorithms for Problems in Matching Theory; SIAM J. Comput, vol. 26, No. 6, pp. 1635-1655, Dec. 1997.
Clark, Chistopher W. et al.; Distribution and Behavior of the Bowhead Whale, Balaena mysticetus, Based on Analysis of Acoustic Data Collected During the 1993 Spring Migration off Point Barrow, Alaska; Report—International Whaling Commission, 46, pp. 541-552; Jan. 1996.
Corneil, Derek G. et al.; LDFS-based Certifying Algorithm for the Minimum Path Cover Problem on Cocomparability Graphs; SIAM J. Comput., vol. 42, No. 3, pp. 792-807; 2013.
Felsner, Stefan et al.; Recognition Algorithms for Orders of Small Width and Graphs of Small Dilworth Number; Order 20, 351-364; Oct. 23, 2003.
Flier, Holger et al.; Vertex Disjoint Paths for Dispatching in Railways; 10thWorkshop on Algorithmic Approaches for Transportation Modelling, Optimization, and Systems (ATMOS'10); pp. 61-73; Sep. 6-10, 2010.
Chen, Yangjun and Chen, Yibin; On the DAG Decomposition; British Journal of Mathematics & Computer Science; 2015.
Dantzig, G.B. et al.; Linear Inequalities and Related Systems (AM-38); Chapter VII, A Primal-Dual Algorithm for Linear Programs; pp. 171-181; Princeton University Press; Oct. 21, 1956.

* cited by examiner

| Call | X(m) | Y(m) | t(s) |
|---|---|---|---|
| 1 | 2375.4 | 4534.5 | 0 |
| 2 | 8242.8 | 6090.4 | 0 |
| 3 | 9657.5 | 7755.3 | 0 |
| 4 | 9726 | 6416.1 | 0 |
| 5 | 1702.1 | 4288.9 | 200 |
| 6 | 8300.9 | 6581 | 200 |
| 7 | 9958.4 | 7714.9 | 200 |
| 8 | 10005.7 | 7090.3 | 200 |
| 9 | -112.5 | 3731.8 | 400 |
| 10 | 8444.8 | 7998.1 | 400 |
| 11 | 11743.6 | 7222 | 400 |
| 12 | 10252.8 | 7470.1 | 400 |
| 13 | -543.5 | 3667.4 | 600 |
| 14 | 8446.3 | 8647.3 | 600 |
| 15 | 13067.5 | 6909.8 | 600 |
| 16 | 11176.8 | 8950.2 | 600 |
| 17 | -1144.7 | 3451.5 | 800 |
| 18 | 8420.9 | 9200.7 | 800 |
| 19 | 13540.9 | 6867.4 | 800 |
| 20 | 11285.4 | 9200.4 | 800 |
| 21 | -2924.9 | 3004.1 | 1000 |
| 22 | 8415.2 | 10591.6 | 1000 |
| 23 | 14678 | 6906.2 | 1000 |
| 24 | 11517.8 | 9612.1 | 1000 |

COMPUTERIZED ESTIMATION OF MINIMUM NUMBER OF SONIC SOURCES USING ANTICHAIN LENGTH

CROSS REFERENCE TO RELATED APPLICATIONS

This application claims benefit of U.S. provisional App. Ser. No. 63/033,711, filed Jun. 2, 2020, which is hereby incorporated by reference.

FIELD OF THE INVENTION

The field of the present invention relates to computerized data processing or analysis of acoustic waves or signals normally representative of discrete sonic events. In particular, computerized machines and methods are disclosed for estimating a minimum number of sonic sources that could have produced a set of discrete sonic events. Specifically, the machine and techniques have particular practical application with respect to determining the number of calling animals, such as whales or other sea animals, or terrestrial animals such as birds, frogs, or mammals, in a vicinity of one or more passive sonic receivers.

BACKGROUND

The disclosed computerized estimation machine and techniques may (not must) achieve various practical objects and offer various practical advantages, including offering new ways to estimate abundance based on reasonably reliable locations of each sound without knowing precise location or having identifiable information.

In particular, people use acoustic data to locate calling animals such as whales. Scientists use such data to study animal behavior, and commercial or governmental entities use such data to avoid harming such wildlife with loud or disturbing sounds, such as emitted by active sonar pings from Navy or commercial ships or air-guns from oil-exploration ships, to name only two. On land or in the air above sea or land, disturbing sounds can include sounds from aircraft, cars or other vehicles, gun shots, or controlled explosions, for example. People also use acoustic data to estimate abundance of calling animals by species, or to estimate the effects on abundance from such disturbances or from related factors such as urbanization and deforestation.

In performing such calculations or estimations, however, a common problem is to know how many sources are producing a series of received sounds. For example, suppose we hear N whale calls but cannot directly observe each animal and do not recognize particular animals from the call. How many animals did we hear? The sounds, in theory, could have been produced by one animal calling N times, by N animals each calling once, or by some intermediate numbers of animals. The answer may change significantly a decision made or an action taken based on such data. For example, regulations may allow use of active sonar in areas where only a few whales are nearby but not where many whales congregate. Or a scientist, government, or environmental organization may wish to estimate the whale population in a given area at a given time, and merely hearing N calls may not answer the question. Reliable estimates for the minimum number of animals responsible for recorded sounds are needed for setting national policies and laws to protect marine and terrestrial animals.

Various known techniques exist for estimating location of a given call received. Estimated location can be derived, for example, by various triangulation techniques, i.e., intersecting directions from the source for disparate passive receivers, or even from a single receiver, directional or otherwise. Other means to passively locate emitted sounds include use of time differences of arrival (TDOA) at widely separated receivers, sequential bound estimation (e.g., U.S. Pat. No. 7,219,032 to this inventor), spherical beamforming, or matched field processing. TDOA techniques are disclosed, for example, by work of this inventor and others published at Spiesberger, J. L., Berchok, C. L., Woodrich, D., Iyer, P. G., Schoeny, A., and Sivakumar, K., *Reliable lower bound for number of calling marine mammals in Chukchi Sea*, J. Acoust. Soc. Am. 146(4), 28062807, doi: 10.1121/1.5136724 (2019) and Spiesberger, J. L., Berchok, C. L., Woodrich, D., Schoeny, A., Iyer, P. G., Yang, E., Lee, E., Iyer, P., and Sivakumar, K., *Locating and censusing calling marine mammals in the Chukchi Sea with time differences of arrival amongst black holes of 2D models*, https://www.alaskamarinescienceorg/agenda, Alaska Marine Science Symposium, Anchorage, Ak. (2020). Estimated locations have uncertainty.

The machines and techniques disclosed are not expected to have practical value where the sounds are known to have emanated from sources that are identified and that have known, exact locations, such as with sounds received from identified airplanes with GPS receivers on them, sounds received from animals tagged with identifiable tracking devices, or sounds received from identified subjects that have been observed (visually or otherwise) at logged locations. By "exact" location, we mean location having been estimated to a degree sufficient to correlate the location with an identified source, within the context of the problem. Even GPS receivers have some uncertainty, for example, and the system may have practical value in resolving sounds coming from sources that are close enough to one another so as to be within the range of uncertainty of such receivers.

The machines and techniques disclosed typically operate on discrete sounds, where it is not clear whether a common source emitted different sounds apparently coming from different locations, or at least have maximum practical use with respect to discrete sounds. "Discrete sounds" refers to sounds from a single source that the receivers do not detect continuously over a period of time of interest to a user, either because the source does not emit the sound continuously or because of interruptions that hamper detection for various reasons, such as variations in noise that interrupt the signal intermittently or fading of paths due to destructive interference in multipath scenarios. Such discrete sounds are called "sonic events," or "calls," in this disclosure. By contrast, it is typically easier to calculate the minimum number of sources from a set of continuous sounds, because information about whether a sound continued or not may make it easier to infer whether sounds at different locations emanate from a single traveling source or multiple sources.

Location-estimation techniques may include estimates of reliability, such as a confidence interval, and such is used by the disclosed techniques. Confidence intervals can have various forms. For example, a location technique may have uncertainty within a range but provide full certainty that the location falls within that range. Or the location technique may identify a confidence interval by setting a given confidence level, such as a 99% or 95% probability, whether Gaussian or other distributions are used. The choice of confidence level or estimation of confidence interval is delegated to the user in view of the specifics of the particular measurement technique and application. The disclosed approach, however, has lower practical application in situations where the confidence interval is unknown or unreliable or cannot be estimated reasonably.

The machines and techniques disclosed typically operate on calls of a common sort, or at least have maximum benefit for a class of such calls. For example, in instances where it is possible to distinguish between whale calls and walrus calls, one might wish to apply the technique separately to two data sets. Likewise, the machines and techniques have maximum practical use when it is not possible to identify specific individuals within the class being considered. If sounds cannot be classified, on the other hand, there may be a benefit to applying the disclosed machines and techniques to a group of calls from disparate species of animals. As a result, the machines and techniques need not operate on calls of a particular type or from a particular species of sea animal. Such data classification decisions are at the discretion of the user for any individual instance or data set.

Persons skilled in the art of animal location or statistical estimation have recognized difficulties in estimating abundance of animals from estimated location data of discrete calls. For example, despite being trained statisticians, the authors of Raftery and Zeh, *Estimating bowhead whale population size and rate* 256 *of increase from the* 1993 *census*, Journal of the American Statistical Association 93(442), 257 451-63, (1998), used location data derived from time-difference-of-arrival (TDOA) and other methods to estimate the abundance of whales in the Arctic, but felt it necessary to state: "In some cases it is impossible to know whether different locations correspond to different whales." Those authors recognized the problem with the reliability of the point measurements but, instead of innovating to estimate abundance in a reliable way, they estimated abundance using many assumptions about the behavior of whales. Those authors are not alone: methods employed to estimate abundance are frequently riddled with a wide variety of assumptions whose validity are often difficult to determine. Another example is found in Buckland, S., et al., *Distance sampling: Estimating abundance of biological populations*, Biometrics 50 (1993) (available at doi: 10.2307/2532812). The machines and techniques disclosed herein, by contrast, do not require possibly unreliable assumptions and therefore offer robust estimates of animal abundance (and tracks) that are more reliable and thus may be more believable.

Brute force calculations typically have little practical value because the problem requires calculation complexity that grows dramatically with the amount of data. Suppose the data set includes 100 calls received at different times. It is possible to estimate which calls are consistent with which others: For example, if a whale would have had sufficient time to swim from one location to another, given an estimate of an animal's speed, we might consider the two calls consistent with one another. To illustrate how such observations alone do not suffice to allow a brute force calculation, imagine that the first call's location is consistent with 20 other call locations, the second call is consistent with 42 other call locations, the third call is consistent with 30 other call locations, a fourth call is consistent with 19 other call locations, and so forth. A brute force method might start with the hypothesis that there is only one animal, but we could easily exclude that case by noticing a location inconsistent with one of the calls. In our example, the first call's location is inconsistent with 80 of the 100 call locations, so one animal could not have produced all of the sounds. Next, the brute force method hypothesizes two animals and attempts to determine if there is a starting location where each of the two animals could each travel fast enough to reach (between them) each of the 100 locations. That is not so easy, compared to proving or refuting the one-animal hypothesis. Just because no two call locations in our example are compatible with all 100 locations (if that is the case when considering the other 96 points as well) does not mean that a path cannot be found for two animals to reach all 100 locations. Even if we refute the two-animal hypothesis, we must proceed to hypothesizing three animals, then four, and so on until we find the minimum number of animals and their associated tracks wherein the locations corresponding to each of the 100 calls are visited by one of those animals. Just because the first four calls, in our example, are compatible with more than 100 locations collectively, also, does not mean that the paths can be found for four animals to start at those locations and eventually reach all 100 locations at the times specified. The number of checks required to implement a brute force technique is on the order of N! (N-factorial), so for example, with 100 call locations, something on the order of 100! checks would be required, but 100! equals a number greater than $9 \times 10^{157}$. Computing using the brute force method, therefore, is not possible with any computer except in cases with a very small number of data points, or in other idealized cases, such as those where no pairs of locations are compatible, because the time to reach a solution using any brute force method increases more than exponentially with the number of data points.

SUMMARY

A method performed using a computerized machine includes (a) determining corresponding temporal and spatial statistical characterization for each of a set of plural sonic events, (b) classifying certain pairings among the plural sonic events as comparable, and (c) estimating a minimum number of sonic sources that could have generated the plural sonic events.

The sonic events arise from an unknown number of sonic sources of a specified class of sonic sources, at least one of which is not at a fixed location. For purposes here, the term "in motion" means that a source of the sonic event is not known to be fixed. In other words, that source is moving with respect to the location of at least one of the receivers, or at least is potentially in motion during an observation period. It need not be known that the source is moving continuously at any particular time within a given time interval; the source may be moving only intermittently, such as with stops and starts. The velocity need not be known or estimated either, nor need it be fixed.

For each sonic event, an event time is characterized by the corresponding temporal statistical characterization, and an event position is characterized by the corresponding spatial statistical characterization. For each pairing of two different sonic events of the set, that pairing is classified as comparable only when that pairing meets a set of one or more preselected constraints; at least some of those constraints depend on the temporal statistical characterizations and the spatial statistical characterizations.

The estimated minimum number of sonic sources that could have generated the plural sonic events is calculated as being equal to the number of sonic events in a longest antichain within a chronological ordering of the set of sonic events. An antichain comprises a corresponding subset of the sonic events for which no pairing of two different sonic events of that subset is a comparable pairing.

A programmed computerized machine, comprising one or more electronic processors and one or more tangible computer-readable storage media operationally coupled to the one or more processors, is structured and programmed to perform the methods disclosed herein. An article, comprising a tangible medium that is not a propagating signal, encodes computer-readable instructions that, when applied to a computerized machine, program the computerized machine to perform the methods disclosed herein.

A method performed using a computerized machine can further include generating a set of distinct paths. Each of the paths denotes an estimated path for one of the estimated minimum number of corresponding sonic sources that, together with the other sonic sources of the estimated minimum number of the sonic sources, could have produced the plural sonic events. In those methods, paths and antichains are generated by partitioning the chronologically ordered set of plural sonic events into a set of disjoint chains. Each chain comprises a subset of the sonic events wherein every pairing of sonic events of that subset is classified as a comparable pairing. Each chain corresponds to one of the paths and includes one and only one corresponding sonic event from a selected longest antichain.

Objects or advantages may become apparent upon referring to the examples illustrated in the drawings or disclosed in the following written description.

This Summary is provided to introduce a selection of concepts in a simplified form that are further described below in the Detailed Description. This Summary is not intended to identify key or essential features or to limit the scope of disclosed subject matter.

BRIEF DESCRIPTION OF THE DRAWINGS

FIG. 1 is a table showing event positions and times for an example series of 24 sonic events.

FIG. 2 is an adjacency matrix constructed for the sonic events listed in FIG. 1.

Figure 3:
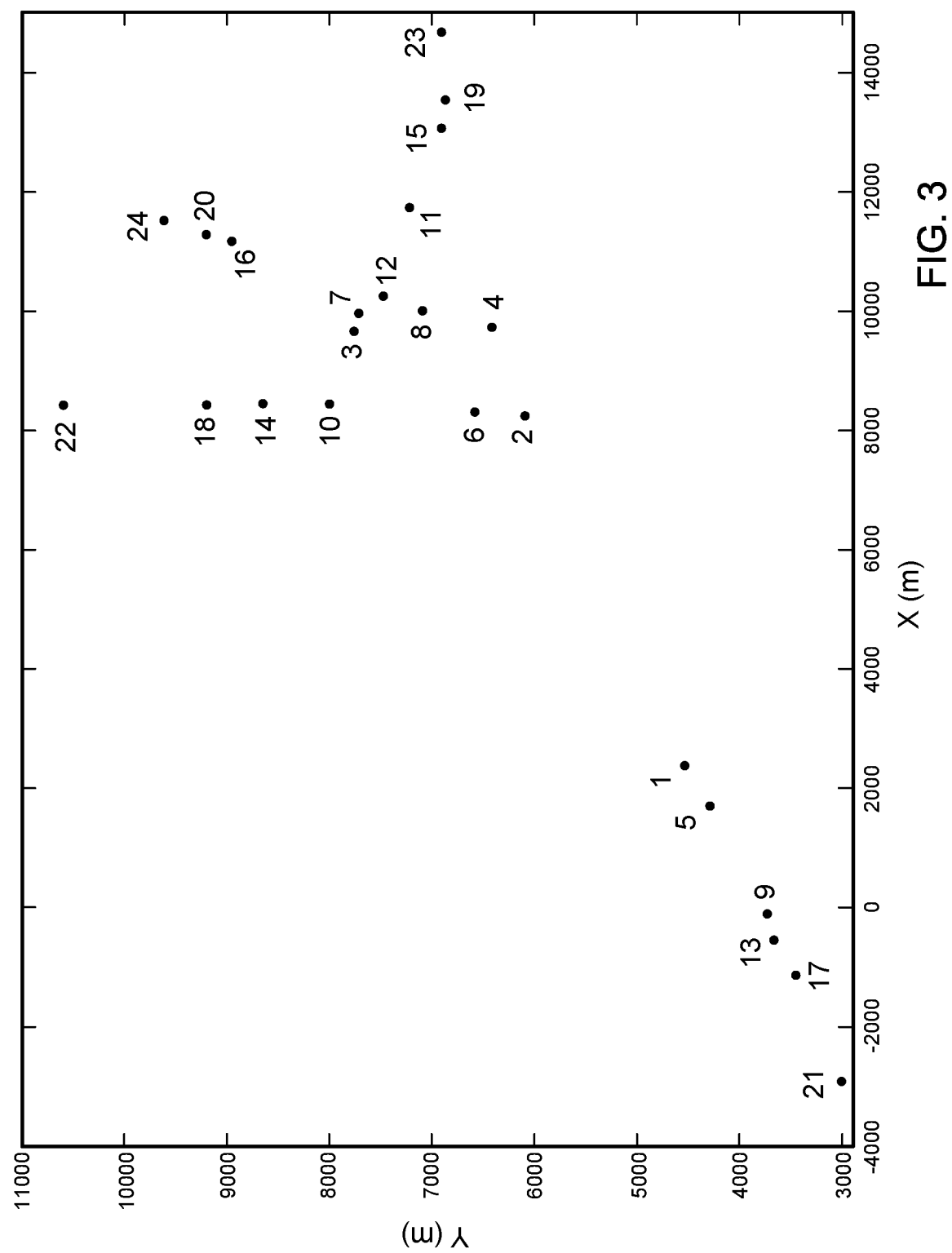
FIG. 3 is a spatial plot of the sonic events listed in FIG. 1.

The examples depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The drawings show examples only and thus should not be construed as limiting the scope of the present disclosure.

DETAILED DESCRIPTION

Disclosed is a specific, improved computerized machine (including programmed computer or tangible storage medium that contains or stores computer program instructions) and associated techniques (methods or processes) capable of computer-estimating the minimum number of sonic sources that collectively produce a time series of sounds, each sound emanating from an estimated but not precisely known location.

Further disclosed are computerized machines and associated techniques for determining possible tracks for each sonic source that could result in the time series of sounds.

For ease of description, this disclosure initially describes an example central process, with only some discussion of variations. It is intended, though, that the disclosed central process, and equivalents thereof, can be modified to create variations.

The remainder of the disclosure refers to calling animals with sounds propagating undersea, for example, but it is understood that the disclosed machine and techniques have application to other sonic sources aside from animals, including in some instances human-created machines such as aircraft or ships.

Reference to "sounds" refers to waves of vibrations (including pressure fluctuations), whether or not audible with unaided human ears, propagating in various media, including in the sea, in other fluids such as the Earth's atmosphere and in solid materials such as the Earth.

Reference to "sea" may include any body of water, including for example oceans, lakes, rivers, and bays, and may in some instances refer to man-made bodies of water, such as pools or catch-ponds. References to "water" may include saltwater or freshwater, as well as other fluids, or mixes of fluids, and may include suspended particulate matter or natural (e.g., fish) or artificial items (e.g., submarines) swimming in or otherwise traversing such fluids.

An example of a possible application in an aircraft setting is estimating the number of aircraft or drones passively from sounds received at different locations at different times. Another example involves doing the same for ships or submarines based on sounds received.

Exemplary receiving or detecting equipment includes transducers such as hydrophones, microphones, vector sensors, or seismic devices.

An unknown number of sonic sources of a specified class (e.g., animals, vessels, aircraft, or vehicles) generate collectively a set (i.e., a time series) of plural discrete sonic events. One or more of the sonic sources are in motion; in some instances most, nearly all, or all of the sonic sources can be in motion.

Each estimated sonic event position can be characterized by a corresponding spatial confidence interval; each estimated sonic event time can be characterized by a corresponding temporal confidence interval. The sonic event times may be overlapping in some instances.

A method, implemented using a programmed computerized machine, includes (a) determining corresponding temporal and spatial confidence intervals for each sonic event, (b) based on the confidence intervals, classifying certain pairings of those sonic events as comparable, and (c) based on the classifications of the pairings, estimating a minimum number of sonic sources that could have generated the plural sonic events. The method can further include computing estimates of the paths traversed by the estimated minimum number of sonic sources to generate the plural sonic events.

In some examples, the sonic sources can include one or more specified species of animal, and the plural sonic events are intermittently received calls of animals of the one or more specified species. In some of those examples, the specified class of sonic sources can include, e.g., one or more specified species of marine or aquatic animal, one or more specified species of marine mammal, or only a single specified species of whale. In other examples, the calls can come from specified types of fish, frogs, birds, or other aquatic, amphibious, land-based, or flying creatures.

In some examples, the specified class of sonic sources includes one or more specified types of marine or aquatic vessel, and the plural sonic events comprise a specified type of sound intermittently received from vessels of the specified type.

In some examples, the specified class of sonic sources includes one or more specified types of land vehicle, and the plural sonic events comprise a specified type of sound intermittently received from vehicles of the specified type.

In some examples, the specified class of sonic sources includes one or more specified types of aircraft, and the plural sonic events comprise a specified type of sound intermittently received from aircraft of the specified type.

In some examples, the specified class of sonic sources includes one or more specified types of land-based, shipboard, or airborne weaponry, and the sonic events comprise a specified type of sound intermittently received from the specified weaponry.

In some examples, the specified class of sonic sources includes sounds created by humans such as voices or footsteps of hikers, or sounds generated by human-carried objects or equipment such as backpacks or scuba gear; such sounds can be measured either with microphones in air or water or with seismic devices detecting sounds (acoustic pressure fluctuations) propagating in the ground. The techniques and equipment can utilize voices when voice-identification does not work, for example, because the voices are muddled or indistinct or because the software to identify people by voice is unavailable. Estimates of the minimum number of people responsible for a group of sounds have value for defense applications.

For each sonic event of the time series of plural sonic events, corresponding event times and positions can be estimated in any suitable way. In some examples the event position can be defined in three dimensions; in some other examples the event position can be defined in only two dimensions (in some of those instances, even if three-dimensional motion of the sonic sources can occur).

The table of FIG. 1 is an exemplary time sequence of estimated two-dimensional event locations and corresponding estimated event times for a sequence of 24 distinct sonic events (e.g., calls of a specified whale species).

In some examples, event positions can be estimated using one or more suitable techniques, e.g., time-differences-of-arrival (TDOA), sequential bound estimation (SBE), Bayesian techniques, spherical beamforming, or match field processing. In TDOA, differences of arrival times of sound from a given sonic event, at multiple sonic sensors at multiple different sensor positions, are used along with the sensor locations to estimate the location of the source of that sonic event (e.g., by triangulation).

The estimated event position and the arrival times can be used to estimate the corresponding event time.

The estimated event location and time are typically inexact, due to uncertainties of sound propagation speed or the sound propagation paths, as well as uncertainties (if any) of the sensor positions or measured time differences. The sonic event position and time are therefore characterized in the most general sense by corresponding functions of spatial and temporal probability distributions, including the probability distributions themselves. Examples of functions of probability distribution include confidence intervals (e.g., 68%, 95%, 99%, or 100%), mean, median, standard deviation, variance, etc. for a sonic event.

Determination of spatial and temporal function used for characterization can be the same for all of the plural sonic events or can vary among the plural sonic events.

As discussed further below, the function of the probability distribution can be adjusted as needed or desired to refine or test the results. We will refer to the selected function of the probability distribution as the event's spatial or temporal "statistical characterization." For example, an event's spatial statistical characterization may be its probability distribution, a confidence interval of its distribution, or a lower or upper bound of the probability distribution if the distribution has finite expanse.

Each temporal statistical characterization, if convenient, can be characterized by one or more corresponding parameters, including one or more of (i) an earlier bound, (ii) a later bound, or (iii) a center (i.e., midway between the earlier bound and the later bound). The sonic event may not be instantaneous but may extend for a period of time. Thus, a temporal statistical characterization may refer, for example, to the probability distribution of the start of the call, the middle of a call, or the end of a call, as seems most suitable for the particular problem.

In some examples, each spatial statistical characterization can be characterized by a boundary of a corresponding two- or three-dimensional region of space in which the sonic event is estimated to have occurred. The boundary can be regular or irregular. Regular regions in two-dimensional space can include, for example, circular, elliptical, rectangular, or square boundaries. Regular regions in three-dimensional space can include, for example, spherical, spheroidal, ellipsoidal, rectangular prismatic, or cubical boundaries. In some instances, the spatial statistical characterization can include disjoint spatial regions, such as if there are insufficient sonic data or if a portion of an estimated special region is impossible (e.g., a peninsula dividing the calculated region within a body of water in which a whale is estimated to be located). For example, in two-dimensional locations determined with TDOA, using only three receivers can result in disjoint spatial regions for the sonic event's estimated location; using four or more receivers resolves any such ambiguity. If needed or desired those boundaries can be parameterized in any suitable way (e.g., largest transverse extent, or area or volume centroid). If details of probability distributions underlying the temporal or spatial statistical characterizations are available (e.g., derived from probability distributions for sound propagation speeds or distances), additional parameters can include, e.g., a peak of the corresponding distribution, a centroid of the corresponding distribution, or a first moment of the corresponding distribution. In some examples, it may be desirable to work with spatial statistical characterizations without boundaries, such as for unbounded probability distributions.

The temporal and spatial statistical characterizations can be determined in any suitable way, based on any suitable measurement or reception of sonic signals generated by the sonic sources, using any suitable array of passive sonic sensors (e.g., microphones, hydrophones, or passive sonar sensors), and using any one or more suitable estimation techniques (including any of those mentioned herein). The position-estimation technique may calculate the positions or spatial statistical characterizations (or both), or they may be calculated or estimated separately.

After temporal and spatial statistical characterizations are determined for the plural sonic events, each pairing of two different sonic events of the set is tested against a set of one or more preselected constraints. At least some of those constraints depend on the temporal and spatial statistical characterizations. A given pairing of sonic events is classified as comparable only if that pairing meets the set of preselected constraints.

In examples where the statistical characterizations for two sonic events are both 100% confidence intervals, the method can determine comparability, i.e., whether a single source could have generated both sonic events, based on when the two confidence intervals overlap.

The same procedure can be applied using lesser confidence intervals, such as 95%. If the statistical characterizations of the two events are characterized as independent probability distributions rather than confidence intervals, for another example, then the decision of comparability can be based on whether the probability that the distributions overlap exceeds a pre-determined value.

For illustration, if the probability that a value drawn from the first distribution falls within the overlapping region is p1, and the probability that a value drawn from the second distribution falls within the same region is p2, then the probability of overlap is p1 times p2.

For yet other examples, the decision of comparability can depend on whether chosen standard deviation locations (such as first, second, or third, as specified in advance) overlap between two probability distributions. The methods and equipment disclosed herein can utilize other tests that base comparability decisions on temporal or spatial statistical characterizations.

In the following paragraphs, spatial or temporal confidence intervals are used for ease of illustration, but other statistical characterizations can be utilized instead.

In some examples a maximum speed is specified for the sonic sources of the specified class (e.g., a maximum observed speed for a particular whale species, a maximum sailing speed of a particular class of ship, or a maximum airspeed for a particular class of aircraft). Many examples use a maximum speed constraint for classifying a given pair of events as comparable.

For a pair of sonic events to meet the so-called maximum speed constraint, a sonic source of the class, moving no faster than its maximum speed, must be able to have generated both sonic events of that pair consistent with the selected statistical characterization, or at least a probability that that single sonic source could have generated both sonic events must exceed a selected probability threshold.

For example, assuming 100% confidence intervals, if the spatial confidence intervals are too far apart spatially for a given temporal separation (or the sonic events are too close together temporally for given spatial separation), then that pair of sonic events is not comparable. In other words, for a non-comparable pair of sonic events, the sonic source could not have generated the earlier sonic event within its corresponding temporal and spatial confidence intervals and then moved fast enough to be positioned within the later event's spatial confidence interval during its temporal confidence interval.

For confidence intervals set at lower confidence levels (e.g., 99%, 95%, and so on), comparability can be classified in the same way, i.e., if the spatial confidence intervals within the 99% (or 95% etc.) bounds are too far apart spatially for a temporal separation within the 99% (or 95% etc.) bounds, then that pair of sonic events is not comparable.

Alternative techniques can use the temporal and spatial probability distributions to classify the pair of sonic events as comparable depending on whether the probability that the same source generated both sonic events of the pair exceeds a selected minimum probability threshold.

Expressing the maximum speed constraint more quantitatively, in some examples the set of one or more preselected constraints includes the constraint that, for each pairing classified as comparable, either (i) the corresponding 100% spatial confidence intervals overlap, or (ii) a minimum distance between the corresponding non-overlapping 100% spatial confidence intervals, divided by a maximum time span encompassed by the corresponding 100% temporal confidence intervals, is less than or equal to a preselected maximum speed of sonic sources of the specified class. That constraint can be modified to include computing corresponding probabilities when using less-than-100% confidence intervals or using corresponding underlying spatial or temporal probability distributions, as noted above.

The maximum time span encompassed by a pair of 100% temporal confidence intervals refers to the maximum time span between the earlier bound of one temporal confidence interval of the pair and the later bound of the other. Thus, for non-overlapping or partly overlapping 100% temporal confidence intervals, the encompassed time span extends from the earlier bound of the earlier interval to the later bound of the later interval. The maximum time span encompassed by a pair of less-than-100% temporal confidence intervals can be defined in the same way.

Minimum distance between non-overlapping spatial confidence interval depends on their particular shapes and orientations; for circular or spherical 100% confidence intervals, for example, the minimum distance is the distance between the boundary surfaces along a line joining their respective centers. The minimum distance can be defined in the same way for a pair of less-than-100% spatial confidence intervals.

Another example illustrates the use of spatial and temporal probability distributions to determine if two events are comparable, using a maximum speed constraint, with probability distributions not characterized by confidence intervals. The determination of comparability considers the constraint of whether the speed of the sonic source is less than or equal to some predetermined maximum speed between two calls. In this example, it is assumed that the spatial and temporal probability distributions are mutually independent, discrete probability distributions (DPDs).

In that example, the DPD for the spatial coordinates, x1 and x2, of two calls can be displayed as f1(x1) and f2(x2). First, the example method or equipment computes the DPD for the absolute value of their difference, s=|x1−x2|, which can be called f(s). The function f(s) then represents the DPD for the spatial distance between the two calls. Second, the example method or equipment computes the DPD for the absolute value of the difference in time, t, and that DPD for the temporal difference between calls can be called g(t). Calculating the probability that f(s)/g(t) is less than or equal to a specified maximum speed, v, can then be accomplished by finding joint combinations of discrete probabilities from f(s) and g(t) such that f(s)/g(t) is less than or equal to v.

For example, if there are only two joint combinations of f and g yielding f(s)/g(t) less than or equal to v, a first one where s and t are in the ranges expressed by [f(s1<=s<=s2)=0.01, g(t1<=t<=t2)=0.02] and a second one where they are in the ranges expressed by [f(s2<=s<=s3)=0.9, g(t2<=t<=t3)=0.8], then the probability of the first occurrence is 0.01 times 0.02, which equals 0.0002, and the probability of the second occurrence is 0.9 times 0.8, which equals 0.72, so the total probability that f(s)/g(t) is less than or equal to v is the sum, 0.0002+0.72, or 0.7202. If the pre-selected threshold probability is 0.7, for example, then the calls are comparable because the probability that the sonic source producing the call traveled at a speed less than or equal to v is 0.7202, which exceeds 0.7.

If the probability distributions have analytical form (e.g., uniform, exponential), standard expressions define the probability distributions of their differences, and the probability distribution for the absolute value of the difference can be derived analytically. An analogous procedure to that explained for discrete distributions can decide comparability for such distributions.

Other suitable constraints, aside from the above-discussed maximum speed constraint, can be employed.

In some examples, a minimum speed constraint might be applicable (in addition to or in lieu of the maximum speed constraint). For example, if a particular bird species were known to call only in flight, then a minimum flight speed can be applied. For another example, if a ship, vehicle, or aircraft is known to emit a particular sound or type of sound only while moving above a certain minimum speed, then a minimum speed constraint can be applied. Under such a constraint, a pair of sonic events would be non-comparable if they occurred too close to each other. Minimum speed constraints might depend on or be established in combination with turning radius, a different constraint discussed below, because of the possibility of the source generating two sounds in nearby locations by circling back.

More quantitatively, in some examples the set of one or more preselected constraints includes the minimum speed constraint that, for each pairing classified as comparable, a maximum distance encompassed by corresponding 100% spatial confidence intervals, divided by a minimum time span encompassed by corresponding 100% temporal confidence intervals, is greater than or equal to a preselected minimum speed of sonic sources of the specified class. The maximum distance encompassed by a pair of 100% spatial confidence intervals depends on their particular shapes and orientations; the minimum time span encompassed by a pair of 100% temporal confidence intervals is defined as the minimum time span between the later bound of one temporal confidence interval of the pair and the earlier bound of the other. Similar to the discussion above, in some examples less-than-100% confidence intervals or probability distributions can be employed to find maximum distance or minimum time span that exceeds a preselected probability threshold.

Some classes of sonic sources might be limited in how soon after generating one sonic event a second sonic event could be generated by that source. For example, a whale species might be physically incapable of calling twice in quick succession or simply have behavioral characteristics such that scientists know that individuals of that species pause for at least a given time between calls for whatever reason. For another example, a shipboard or airborne weapon might require a reload or recharge cycle between firings.

If the plural sonic sources are limited in that way, then in some examples the set of one or more preselected constraints can further include, for each pairing classified as comparable, the minimum-separation-time constraint that a time span separating the corresponding temporal confidence intervals is greater than a preselected minimum time between sonic events for sonic sources of the specified class, or that the probability that the time span is greater than the minimum exceeds a preselected probability threshold.

Some classes of sonic sources might be limited in their types of movement, e.g., by a maximum turning rate or minimum turning radius. For example, if a supertanker can only turn at a given rate, it may have a maximum speed that would seem to allow time for the ship to pass from point A to point B and then to point C, but if point C is spaced far from the line passing through points A and B, a slow turning rate of the ship might preclude it from arriving at point C even at maximum speed.

If the plural sonic sources are limited in that way, then in some examples the set of one or more preselected constraints can further include a turning-rate constraint, such that, for each pairing classified as comparable, a corresponding turning rate is less than a preselected maximum turning rate for sonic sources of the specified class (equivalently, a turning radius being larger than a preselected minimum turning radius). A preselected probability threshold can be employed for less-than-100% confidence intervals or probability distributions, as discussed above.

Classification using a turning rate or turning radius constraint is more complicated than other examples described. Before applying that constraint, possible paths for the sonic sources are calculated (described further below), and those paths are compared to the turning rate or turning radius constraint. Comparable pairs of sonic events are those for which possible paths between them satisfy the turning rate or turning radius constraint. In some examples requiring certainty of satisfying a turning rate or turning radius constraint, all possible paths between the two sonic events must satisfy the constraint to classify the two sonic events as comparable. Other examples may classify two sonic events as comparable if at least some preset fraction of the calculated possible paths satisfies the constraint.

In some examples, the method and equipment can estimate change in direction between any two spatial characterizations of a pair of calls. For example, where the statistical characterizations utilize 100% confidence intervals and locations are estimated in two dimensions, intervals can be defined by binning regions of space with rectangles, where each rectangle represents a region from where the call might have emanated. The minimum and maximum angles between any two rectangles can be calculated by computing the angles between each of a first rectangle's vertices and each of a second rectangle's vertices, producing 16 values, and determining the minimum and maximum values. If a first set of calls has n1 rectangles and a second set of calls has n2 rectangles, then the computation of the minimum and maximum angles can occur for all n1*n2 pairings, then a determination can be made of the overall minimum and maximum angles between any two calls of the two sets. Repeating that procedure for each pair of calls in a track can produce estimates of a turning radius required to produce that track. The turning rate can be estimated by combining the estimates of change in angle with estimates of the change in times between calls.

With the pairings of sonic events classified as comparable or non-comparable as described above, a minimum number of sonic sources that could have generated the entire set of plural sonic event can be estimated.

Within a chronological ordering of the set of plural sonic events (i.e., treating the plural sonic events as a partially ordered set, often referred to as a poset), the number of sonic events in a longest antichain is determined by suitable techniques (as discussed further below).

An antichain is defined as a subset of the sonic events for which no pairing of two different sonic events of that subset is a comparable pairing (i.e., no two sonic events of an antichain could have been generated by the same sonic source). There can be multiple antichains within the partially ordered set of sonic events, and there can even be multiple longest antichains (obviously of the same length as one another).

The length of the longest antichain (i.e., the number of sonic events in the longest antichain) is equal to the minimum number of sonic sources that could have generated the entire set of plural sonic events, applying Dilworth's theorem. See Dilworth, R. P., *A decomposition theorem for partially ordered sets*, Annals Math. 51(1), 161-66 (available at http://www.jstor.org/stable/1969503), 10.1007/978-0-8176-4842-8 10 (1950) (minimum number of chains equals the number of elements of the largest antichain of a finite partially ordered set).

In some instances it may be desirable to characterize the robustness of the estimation of the minimum number of sonic sources, or to characterize the sensitivity of the estimate with respect to small changes in the statistical characterizations or the preselected constraints. Accordingly, in some examples the method can further include repeating the classification of the sonic events as comparable or non-comparable, and determining the length of the longest antichain, using one or both of (i) one or more altered spatial or temporal statistical characterizations or (ii) an altered set of one or more preselected constraints.

Instead of the deterministic constraints described above, in some examples those constraints or other suitable constraints can instead include one or more probability distributions characterizing behavior of the sonic sources (e.g., a distribution of maximum speeds of a particular species of whale, or a distribution of turning radii for marine vessels). In such examples, estimating the minimum number of sonic sources includes determining a probability distribution for the number of sonic events in a longest antichain.

In some examples that process typically would include repeated determinations using different constraints within and weighted by the corresponding distributions (e.g., using Monte Carlo techniques), computing a probability for each of the minimum number of sources over those repeated determinations, and establishing summary statistics, such as a mean, variance, or other specified statistical characterization. Other suitable techniques can be employed.

The chronological ordering of the plural sonic events can be achieved in any suitable way. In some examples, the chronological ordering of the plural sonic events can be ordered according to one or more parameters described above as characterizing temporal confidence intervals. In some examples the sonic events can be chronologically ordered according to one or more of (i) corresponding earlier bounds, (ii) corresponding later bounds, or (iii) corresponding centers of the corresponding temporal confidence intervals. In some examples the sonic events can be chronologically ordered according to one or more of (i) corresponding peaks, (ii) corresponding centroids, or (iii) corresponding first moments of the corresponding temporal confidence intervals, if one or more of those parameters are available.

In some instances the relative chronological order of a subset of the sonic events might be ambiguous (e.g., sharing the same earlier bound, the same later bound, or center). If the ordering cannot be determined based on one parameter, in some instances an additional parameter can be used to resolve the order. Instead, or in instances wherein no parameters unambiguously determine a relative chronological order, a relative ordering can be randomly or arbitrarily assigned in some examples. The selected order does not affect the determination of the longest antichain of the partially ordered set of sonic events, and hence it does not affect the estimation of the smallest number of sonic sources that could have generated the plural sonic events. However, the selected order could affect the path calculation.

Any suitable computational technique can be employed to determine the length of the longest antichain from the partially ordered set of plural sonic events. In some techniques, the length of the longest antichain is determined by partitioning the chronologically ordered set of sonic events into disjoint subsets, each of which constitutes a chain (i.e., a subset of sonic events all of which are comparable with one another), and then determining the number of sonic events in the longest antichain by counting the number of such chains that encompasses the entire set of sonic events. The chains are related to the antichain in this context because each chain represents a subset of the sonic events corresponding to one of the paths and includes one and only one corresponding sonic event from a first selected longest antichain.

Other mathematically equivalent techniques directly or indirectly determining the length of the longest antichain are known and could be used instead. A survey article listing some possibilities is lkiz (2004), and other techniques are described, for example, by Felsner (2003), Mucha (2004) (randomized algorithms), and Dantzig (1956) (linear programming). Copies of those articles, and others cited in this disclosure, are provided contemporaneously, and all such articles are hereby incorporated by reference as if set forth in full in this disclosure.

Various techniques for determination of a longest antichain utilize various ways of displaying the comparability data described above. Some examples include generating an adjacency matrix ordered according to the chronologically ordered set of the plural sonic events and including indicia denoting whether pairings of the plural sonic events are comparable.

Figure 2:
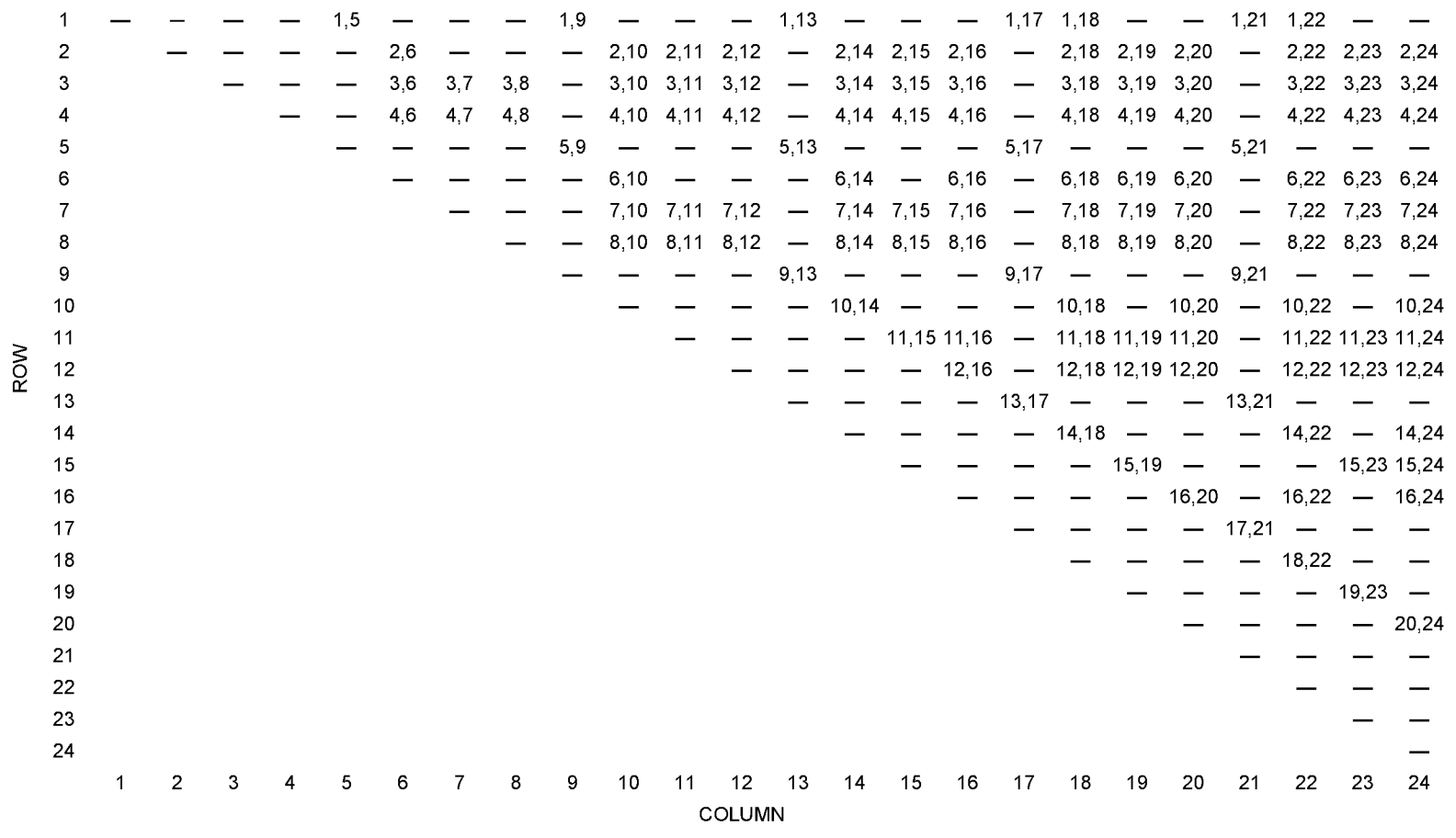

An example adjacency matrix for the sonic events listed in the table of FIG. 1 is shown in FIG. 2. The rows and columns of the adjacency matrix each refer to sonic events and are arranged in a selected chronological order as described above. The matrix elements above the diagonal are filled with comparability data for each pairing of sonic events. For comparable pairings, the corresponding matrix entries are non-zero (e.g., one); for non-comparable pairings, the corresponding matrix elements are zero. In FIG. 2, the zeroes appear as small dashes, and the non-zero elements are indicators of the element's row and column numbers (for ease of understanding). For N sonic events, the number of matrix elements above the diagonal is $N(N-1)/2$; for 100 sonic events, for example, there are 4950 matrix elements.

Software for computing a longest antichain from the information in an adjacency matrix can be found, e.g., Freese, R. J., et al., *Free Lattices*, AMS, Vol. 42, p. 226 (1995) (available for networkX 2.4 documentation at https://networkx.github.io/documentation/stable/reference/algorithms/generated/networkx.algorithms.dag.antichains.html?highlight=dag%20antichains#networkx.algorithms.dag.antichains). Custom software that can compute the longest antichain from the above-described adjacency matrix is included in the software appendix included as part of the instant application.

A particular approach calculates the maximum matching of a bipartite graph that is a conversion of the adjacency matrix discussed above. For a bipartite graph, a maximum matching is comprised of the greatest number of edges connecting the two sets of bipartite vertices such that distinct edges do not contain common vertices. Computing maximum matching can in turn be determined by applying various algorithms, including the Hoperoft-Karp-Karzanov algorithm (Gabow, 2017), Hungarian algorithm (Kuhn, 1955), Ford-Fulkerson algorithm (Cormen et al., 2001), approximation algorithms (Dufosse et al., 2018), and randomized algorithms (Mucha and Sankowski, 2004). The chains can be constructed from the maximum matching. Determining a minimum number of such distinct chains that encompass the entire set of sonic events is equivalent to determining the number of sonic events in the longest antichain, as noted above.

The machines and methods disclosed herein can also be employed to find possible paths traversed by the minimum number of sonic sources to generate the plural sonic events. In some examples, the machines and methods disclosed herein also compute a set of distinct paths, with each of the paths denoting an estimated path for one of the estimated minimum number of corresponding sonic sources. Any suitable computational technique can be employed for partitioning the plural sonic events into distinct chains, e.g., the chains can be computed from the computed maximum matching, as noted above. Various mathematically equivalent techniques for computing chains are known and can be used. Computing the chains representing possible paths is performed at the same time as computing the length of the longest antichain in some methods of calculation.

If, for example, the first selected longest antichain set is [1, 3, 7], the comparability information would indicated that the following three call pairs could not have been produced by a single animal: (1-3), (1-7), and (3-7), and so there are three chains, each chain corresponding to the track of one animal, one track passing though point 1, a second track passing through point 3, and a third track passing through point 7. Every pairing of two different sonic events of a given chain of the first set is classified as comparable, i.e., a single moving sonic source could have passed through each spatial confidence interval of the path consistent with the corresponding temporal statistical characterization while generating a corresponding one of the sonic events of the chain. Any suitable computational technique can be employed for partitioning the plural sonic events into distinct chains for estimating paths, including those discussed above.

The generated paths are not necessarily unique, as there may be different solutions, each yielding different paths for the sonic sources. For example, in some instances of the example described above there might be another antichain, also including three different sonic events, e.g., the events [2, 4, 8]. Partitioning the sonic events according to that second, different set of non-comparable sonic events (as described above for the first antichain) can generate a second set of paths different from the paths of the first generated set.

Software to compute all of the possible maximum matchings is available from Chi Xu (2016) and Guangzhi Xu (2017), for example. If the maximum matching technique is implemented, different maximum matchings can be determined using a method disclosed by Uno (1997). The software disclosed herein implements the computation for this implementation.

FIG. 3 is a plot of the locations (without statistical characterization shown, for simplicity) of the sonic events listed in the table of FIG. 1 and for which the adjacency matrix of FIG. 2 was generated; the numbers displayed indicate the chronological order in which the sonic events occurred. The estimated minimum number of sonic sources that could have produced those sonic events is four (determined, for example, by operating as described above on the adjacency matrix of FIG. 2).

Figure 4:
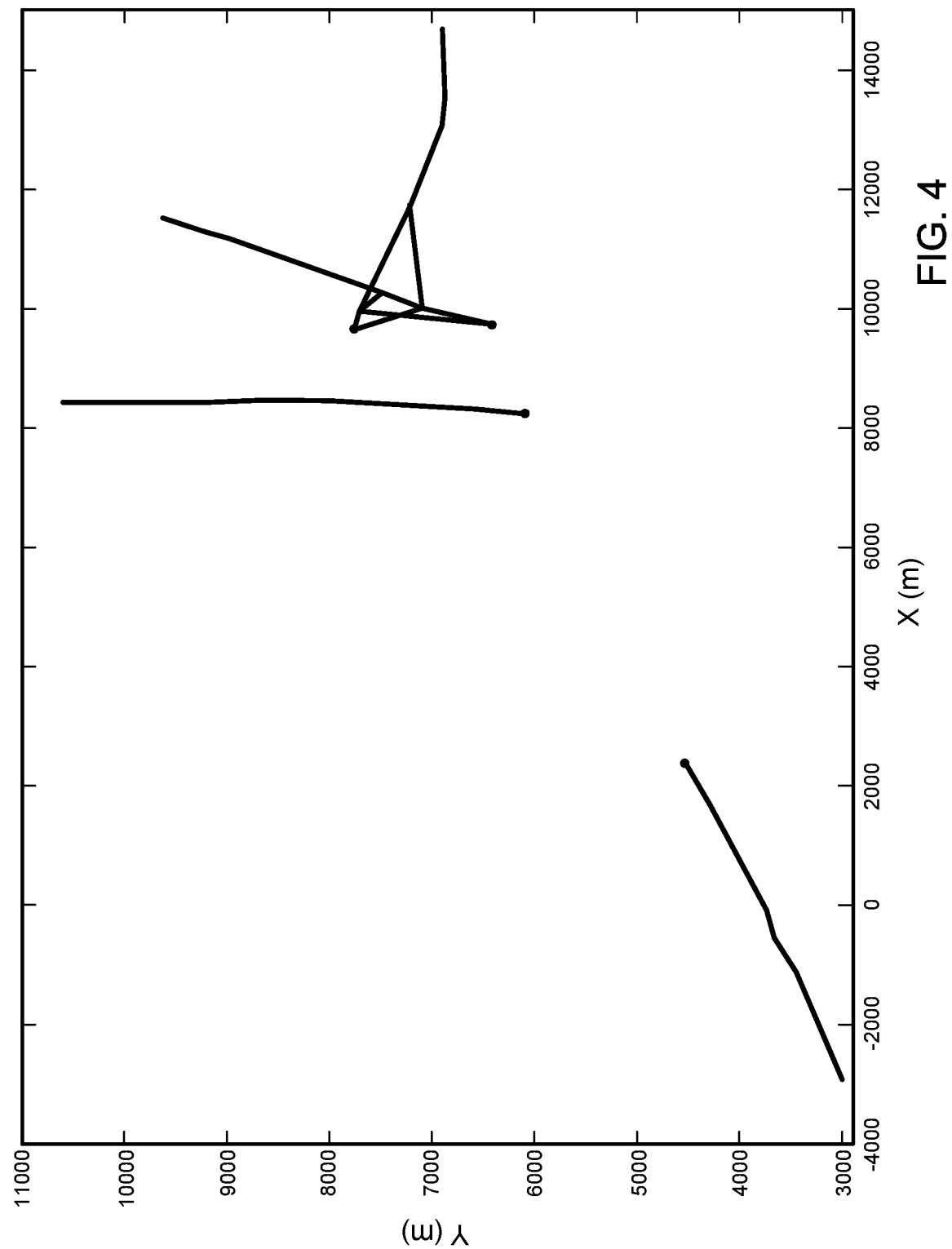
FIGS. 4-7 are spatial plots of multiple estimated paths of sonic sources calculated as capable of having produced the sonic events listed in FIG. 1.

FIG. 4 is a plot of multiple possible paths of four moving sonic sources that could have produced the 24 sonic events. For the two leftmost sources represented in FIG. 4, there is only one possible path for each source. For the two rightmost sources in FIG. 4, there are multiple possible paths for each source.

Figure 5:
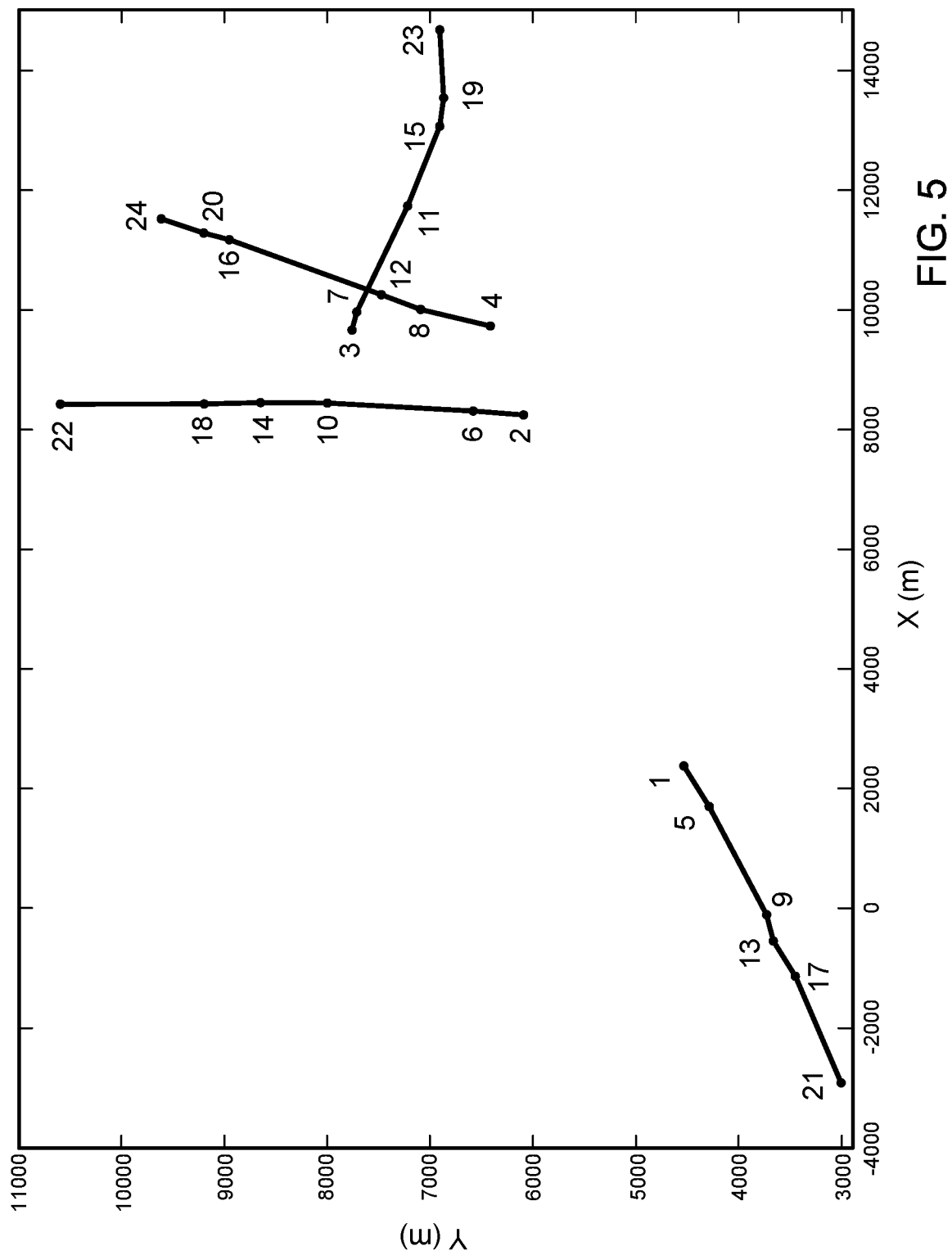
Figure 6:
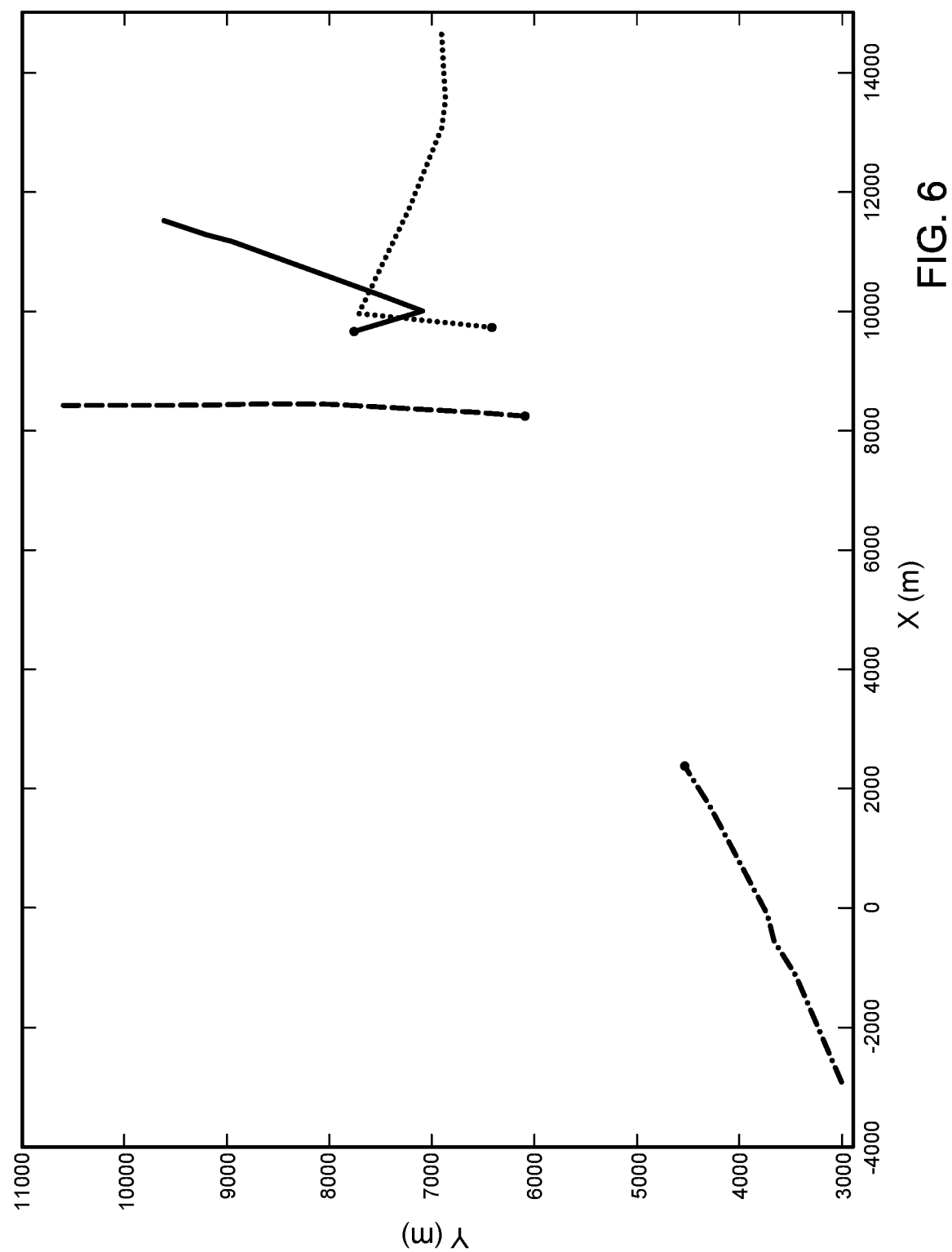
Figure 7:
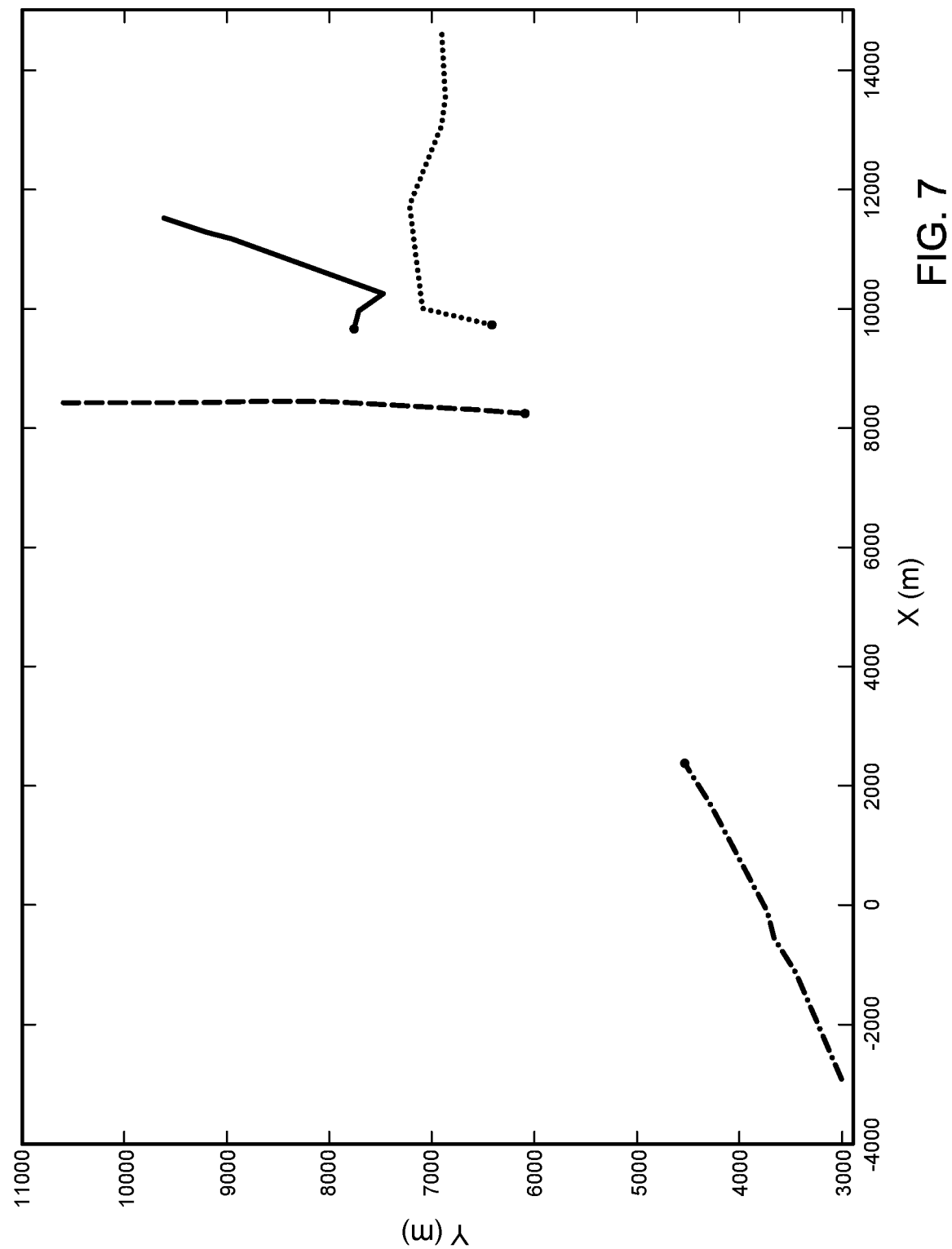

FIGS. 5, 6, and 7 show different possible chains for the four moving sonic sources (dots representing the estimated locations of the 24 sonic events shown in FIG. 5) that could have produced the 24 sonic events as the moving sonic sources traversed those paths.

In some instances it may be desirable to characterize the robustness of the estimation of the multiple paths of sonic sources, or to characterize the sensitivity of the estimated paths with respect to small changes in the statistical characterization or the preselected constraints. Accordingly, in some examples the machines and methods can further repeat the calculation of the paths using one or both of (i) one or more altered spatial or temporal statistical characterization or (ii) an altered set of one or more preselected constraints.

The order of steps described above is not necessarily fixed; steps can be performed in any suitable order. Any combinations of the steps described above in combination with any selected calculation technique, for any one of the applications described herein, can be considered as an example taught by this disclosure.

A programmed computerized machine comprising one or more electronic processors and one or more tangible computer-readable storage media operationally coupled to the one or more processors can be structured and programmed to perform any of the methods described above. An article comprising a tangible medium that is not a propagating signal can encode computer-readable instructions that, when applied to a computerized machine, program the computerized machine to perform any of the methods described above.

Computer code for one example implementation is disclosed in an appendix that is part of this application. Incorporated by reference herein is a computer program listing appendix submitted concurrently on a compact disc (with one duplicate). The following is a list of files on the compact disc, with their date of creation and their sizes in bytes:

| Size | Creation Date | File Name |
| --- | --- | --- |
| 4040 | Jul. 2, 2020 | adjacency_matrix_from_speed_vals.m |
| 12497 | Jul. 2, 2020 | all_combinations_permute_subgroups.m |
| 3842 | Jul. 2, 2020 | ambiguous_call_order_disjoint_graph.m |
| 2423 | Jul. 2, 2020 | bin_numb_to_coord_2d.m |
| 460 | Jul. 2, 2020 | binnumb_to_row_col.m |
| 20269 | Jul. 3, 2020 | bipartitematching_jls.py |
| 21619 | Jul. 2, 2020 | charles_xu_code_max_matchings.m |
| 803 | Jul. 2, 2020 | compl.m |
| 19347 | Jul. 2, 2020 | construct_chain_partitions_bipartite.m |
| 9912 | Jul. 2, 2020 | construct_chain_partitions_bipartite_sub1.m |
| 6713 | Jul. 2, 2020 | convert_vertex_numbs_in_e.m |
| 5187 | Jul. 3, 2020 | create_speed_matrix_upper_triang.m |
| 7326 | Jul. 2, 2020 | d_3d_two_bin_sets.m |
| 8760 | Jul. 2, 2020 | disjoint_graphs.m |
| 8631 | Jul. 2, 2020 | disjoint_path_covers.m |
| 7248 | Jul. 2, 2020 | disjoint_path_covers_connected_graph.m |
| 3260 | Jul. 2, 2020 | display_speed_matrix.m |
| 4558 | Jul. 2, 2020 | dist_bnds_2d_with_vert_uncertainty.m |
| 4421 | Jul. 2, 2020 | dist_bnds_rec_and_locs.m |
| 1506 | Jul. 2, 2020 | draw_boundaries_specified_bins_in_region.m |
| 876 | Jul. 2, 2020 | draw_region.m |
| 15421 | Jul. 2, 2020 | enumerate_call_time_orderings.m |
| 11011 | Jul. 2, 2020 | enumerate_chain_partition_time_ambiguity.m |
| 12695 | Jul. 2, 2020 | enumerate_tracks_time_ambiguity.m |
| 1289 | Jul. 2, 2020 | error_tabulate.m |
| 38621 | Jul. 2, 2020 | estimate_lower_bnd_animals_that_called.m |
| 18509 | Jul. 3, 2020 | estimate_lower_bnd_animals_that_called_simulator.m |
| 23557 | Jul. 2, 2020 | exterior_region_dist_ang.m |
| 40823 | Jul. 2, 2020 | exterior_region_dist_ang_combine.m |
| 12195 | Jul. 2, 2020 | exterior_regions.m |
| 1824 | Jul. 2, 2020 | fill_specified_bins_translucent1.m |
| 1077 | Jul. 2, 2020 | fill_trace.m |
| 1997 | Jul. 2, 2020 | get_all_bin_verticies.m |
| 124 | Jul. 3, 2020 | get_all_max_matchings.pl |
| 1558 | Jul. 2, 2020 | get_bin_verticies.m |
| 3323 | Jul. 2, 2020 | get_call_time_bnds.m |
| 2086 | Jul. 2, 2020 | get_locs_in_time_win.m |
| 957 | Jul. 2, 2020 | intersect_intervals.m |
| 3252 | Jul. 2, 2020 | intersect_rectangle_a.m |
| 7684 | Jul. 2, 2020 | loc_format_convert1.m |
| 9219 | Jul. 2, 2020 | lower_bnd_animals_that_called.m |

| Size | Creation Date | File Name |
|---|---|---|
| 6244 | Jul. 3, 2020 | make_call_locs.m |
| 1775 | Jul. 2, 2020 | make_debug_output.m |
| 597 | Jul. 2, 2020 | make_hasse_diagram.m |
| 1344 | Jul. 2, 2020 | matrix_transform1.m |
| 4204 | Jul. 2, 2020 | max_dist_bins.m |
| 3829 | Jul. 3, 2020 | max_elements_antichain_dag |
| 1651 | Jul. 2, 2020 | mean_rec_locs.m |
| 3911 | Jul. 2, 2020 | merge_sorted_intervals.m |
| 4131 | Jul. 2, 2020 | min_dist_between_locs.m |
| 812 | Jul. 2, 2020 | new_numb_to_orig_numb.m |
| 9095 | Jul. 2, 2020 | number_orderings_each_subgroup.m |
| 7249 | Jul. 2, 2020 | orderings_intervals_in_group.m |
| 1632 | Jul. 2, 2020 | perms_jls.m |
| 2151 | Jul. 2, 2020 | permsr.m |
| 5574 | Jul. 3, 2020 | plt_distinct_animal_locs.m |
| 8189 | Jul. 2, 2020 | plt_hasse_realizations.m |
| 2252 | Jul. 2, 2020 | plt_limits_slideshow_sbe_locs.m |
| 1651 | Jul. 3, 2020 | plt_location_tracks.m |
| 3985 | Jul. 2, 2020 | plt_time_bnds_call_orders.m |
| 6881 | Jul. 2, 2020 | plt_track_realizations.m |
| 2832 | Jul. 2, 2020 | plt_true_loc_and_region1.m |
| 2485 | Jul. 3, 2020 | positive_area_locs_from_points.m |
| 2781 | Jul. 3, 2020 | prepare_java_dir_run_BipartiteMatching_jls.m |
| 2384 | Jul. 2, 2020 | print_output.m |
| 1331 | Jul. 2, 2020 | program_name_to_program_number.m |
| 3093 | Jul. 2, 2020 | put_matfile_in_fields.m |
| 2490 | Jul. 2, 2020 | row_col_sym_to_linear.m |
| 2339 | Jul. 2, 2020 | rows_cols_call_i_speed_matrix.m |
| 6972 | Jul. 2, 2020 | select_time_win_locs.m |
| 3754 | Jul. 2, 2020 | show_tracks.m |
| 2333 | Jul. 2, 2020 | signal_speed_bnds_from_sbe_2d_analytical_output.m |
| 1900 | Jul. 3, 2020 | simulated_locs_for_plt_distinct_animal_locs.m |
| 5133 | Jul. 2, 2020 | slideshow_sbe_locs.m |
| 514 | Jul. 2, 2020 | sort_intervals_start_times.m |
| 5418 | Jul. 2, 2020 | speed_matrix_from_call_time_bounds.m |
| 4787 | Jul. 3, 2020 | speed_matrix_from_locs.m |
| 3017 | Jul. 2, 2020 | summarize_ambig_time_ordering.m |
| 1095 | Jul. 2, 2020 | transform_matrix_specified_order.m |
| 7552 | Jul. 2, 2020 | transform_v_order.m |
| 9984 | Jul. 2, 2020 | two_d_dist_bounds_bins.m |
| 1445 | Jul. 2, 2020 | two_intervals_dist_bnds.m |
| 2263 | Jul. 2, 2020 | verticies_each_disjoint_graph.m |

The public-domain software included is from https://github.com/charlesxuuu/EnumMatching (www.chixu.me; May 31, 2016).

| Size | Creation Date | File Name |
|---|---|---|
| 5434 | Jun. 16, 2016 | AcyclicLP.java |
| 5222 | Jun. 16, 2016 | AcyclicSP.java |
| 5860 | Jun. 16, 2016 | AdjMatrixEdgeWeightedDigraph.java |
| 5125 | Jun. 16, 2016 | Alphabet.java |
| 2864 | Jun. 16, 2016 | Arbitrage.java |
| 6562 | Jun. 16, 2016 | AssignmentProblem.java |
| 1615 | Jun. 16, 2016 | Average.java |
| 11421 | Jun. 16, 2016 | BST.java |
| 6842 | Jun. 16, 2016 | BTree.java |
| 1036 | Jun. 16, 2016 | Bag$ListIterator.class |
| 427 | Jun. 16, 2016 | Bag$Node.class |
| 1913 | Jun. 16, 2016 | Bag.class |
| 3680 | Jun. 16, 2016 | Bag.java |
| 10840 | Jun. 16, 2016 | BellmanFordSP.java |
| 1293 | Jun. 16, 2016 | BinaryDump.java |
| 10804 | Jun. 16, 2016 | BinaryIn.java |
| 9446 | Jun. 16, 2016 | BinaryOut.java |
| 2766 | Jun. 16, 2016 | BinarySearch.java |
| 7164 | Jun. 16, 2016 | BinarySearchST.java |
| 9068 | Jun. 16, 2016 | BinaryStdIn.java |
| 8083 | Jun. 16, 2016 | BinaryStdOut.java |
| 6505 | Jun. 16, 2016 | Bipartite.java |
| 6848 | Jun. 16, 2016 | BipartiteMatching.class |
| 11750 | Jun. 16, 2016 | BipartiteMatching.java |
| 8013 | Jun. 16, 2016 | BipartiteMatching_jls.class |
| 17582 | Jun. 16, 2016 | BipartiteMatching_jls.java |
| 1770 | Jun. 16, 2016 | BlackFilter.java |
| 6693 | Jun. 16, 2016 | BoruvkaMST.java |
| 4272 | Jun. 16, 2016 | BoyerMoore.java |
| 5859 | Jun. 16, 2016 | BreadthFirstDirectedPaths.java |
| 8030 | Jun. 16, 2016 | BreadthFirstPaths.java |
| 5417 | Jun. 16, 2016 | CC.java |
| 3174 | Jun. 16, 2016 | CPM.java |
| 1614 | Jun. 16, 2016 | Cat.java |
| 5031 | Jun. 16, 2016 | ClosestPair.java |
| 7386 | Jun. 16, 2016 | CollisionSystem.java |
| 5216 | Jun. 16, 2016 | Complex.java |
| 1211 | Jun. 16, 2016 | Count.java |
| 2518 | Jun. 16, 2016 | Counter.java |
| 4734 | Jun. 16, 2016 | Cycle.java |
| 5874 | Jun. 16, 2016 | Date.java |
| 1304 | Jun. 16, 2016 | DeDup.java |
| 4279 | Jun. 16, 2016 | DegreesOfSeparation.java |
| 2353 | Jun. 16, 2016 | DepthFirstDirectedPaths.class |
| 3987 | Jun. 16, 2016 | DepthFirstDirectedPaths.java |
| 3926 | Jun. 16, 2016 | DepthFirstOrder.class |
| 6957 | Jun. 16, 2016 | DepthFirstOrder.java |
| 3787 | Jun. 16, 2016 | DepthFirstPaths.java |
| 3206 | Jun. 16, 2016 | DepthFirstSearch.java |
| 3766 | Jun. 16, 2016 | Digraph.class |
| 6700 | Jun. 16, 2016 | Digraph.java |
| 15987 | Jun. 16, 2016 | DigraphGenerator.java |
| 3102 | Jun. 16, 2016 | DijkstraAllPairsSP.java |
| 8193 | Jun. 16, 2016 | DijkstraSP.java |
| 4768 | Jun. 16, 2016 | DirectedCycle.java |
| 2128 | Jun. 16, 2016 | DirectedDFS.class |
| 3886 | Jun. 16, 2016 | DirectedDFS.java |
| 1687 | Jun. 16, 2016 | DirectedEdge.class |
| 2758 | Jun. 16, 2016 | DirectedEdge.java |
| 2102 | Jun. 16, 2016 | DoublingRatio.java |
| 1892 | Jun. 16, 2016 | DoublingTest.java |
| 40717 | Jun. 16, 2016 | Draw.java |
| 221 | Jun. 16, 2016 | DrawListener.java |
| 3679 | Jun. 16, 2016 | Edge.java |
| 4021 | Jun. 16, 2016 | EdgeWeightedDigraph.class |
| 7873 | Jun. 16, 2016 | EdgeWeightedDigraph.java |
| 6273 | Jun. 16, 2016 | EdgeWeightedDirectedCycle.java |
| 8259 | Jun. 16, 2016 | EdgeWeightedGraph.java |
| 6254 | Jun. 16, 2016 | FFT.java |
| 3183 | Jun. 16, 2016 | FarthestPair.java |
| 1929 | Jun. 16, 2016 | FileIndex.java |
| 2500 | Jun. 16, 2016 | FlowEdge.class |
| 7583 | Jun. 16, 2016 | FlowEdge.java |
| 3554 | Jun. 16, 2016 | FlowNetwork.class |
| 6770 | Jun. 16, 2016 | FlowNetwork.java |
| 9429 | Jun. 16, 2016 | FloydWarshall.java |
| 5266 | Jun. 16, 2016 | FordFulkerson.class |
| 9148 | Jun. 16, 2016 | FordFulkerson.java |
| 2869 | Jun. 16, 2016 | FrequencyCounter.java |
| 1015 | Jun. 16, 2016 | GREP.java |
| 5665 | Jun. 16, 2016 | GabowSCC.java |
| 2186 | Jun. 16, 2016 | GaussianElimination.java |
| 1570 | Jun. 16, 2016 | Genome.java |
| 3330 | Jun. 16, 2016 | GrahamScan.java |
| 6000 | Jun. 16, 2016 | Graph.java |
| 14260 | Jun. 16, 2016 | GraphGenerator.java |
| 3558 | Jun. 16, 2016 | Heap.java |
| 1467 | Jun. 16, 2016 | HexDump.java |
| 5699 | Jun. 16, 2016 | Huffman.java |
| 8612 | Jun. 16, 2016 | In.class |
| 17003 | Jun. 16, 2016 | In.java |
| 12259 | Jun. 16, 2016 | IndexMaxPQ.java |
| 12376 | Jun. 16, 2016 | IndexMinPQ.java |
| 5161 | Jun. 16, 2016 | Insertion.java |
| 3389 | Jun. 16, 2016 | InsertionX.java |
| 6266 | Jun. 16, 2016 | Interval1D.java |
| 3896 | Jun. 16, 2016 | Interval2D.java |
| 4147 | Jun. 16, 2016 | KMP.java |
| 2320 | Jun. 16, 2016 | KWIK.java |
| 2657 | Jun. 16, 2016 | Knuth.java |
| 2924 | Jun. 16, 2016 | KosarajuSharirSCC.class |
| 6697 | Jun. 16, 2016 | KosarajuSharirSCC.java |
| 6157 | Jun. 16, 2016 | KruskalMST.java |

-continued

| Size | Creation Date | File Name |
|---|---|---|
| 1445 | Jun. 16, 2016 | LRS.java |
| 3536 | Jun. 16, 2016 | LSD.java |
| 2866 | Jun. 16, 2016 | LZW.java |
| 7092 | Jun. 16, 2016 | LazyPrimMST.java |
| 5227 | Jun. 16, 2016 | LinearProbingHashST.java |
| 5138 | Jun. 16, 2016 | LinearRegression.java |
| 3447 | Jun. 16, 2016 | LinkedBag.java |
| 6225 | Jun. 16, 2016 | LinkedQueue.java |
| 5549 | Jun. 16, 2016 | LinkedStack.java |
| 2212 | Jun. 16, 2016 | LongestCommonSubstring.java |
| 2427 | Jun. 16, 2016 | LookupCSV.java |
| 2234 | Jun. 16, 2016 | Lookupindex.java |
| 5714 | Jun. 16, 2016 | MSD.java |
| 8721 | Jun. 16, 2016 | MaxPQ.java |
| 6032 | Jun. 16, 2016 | Merge.java |
| 3836 | Jun. 16, 2016 | MergeBU.java |
| 4703 | Jun. 16, 2016 | MergeX.java |
| 8654 | Jun. 16, 2016 | MinPQ.java |
| 2429 | Jun. 16, 2016 | Multiway.java |
| 2551 | Jun. 16, 2016 | MyDepthFirstDirectedPaths.class |
| 2914 | Jun. 16, 2016 | MyDepthFirstDirectedPaths.java |
| 1582 | Jun. 16, 2016 | MyDigraph.class |
| 1196 | Jun. 16, 2016 | MyDigraph.java |
| 336 | Jun. 16, 2016 | MyFlowNetwork.class |
| 348 | Jun. 16, 2016 | MyFlowNetwork.java |
| 3638 | Jun. 16, 2016 | NFA.java |
| 5831 | Jun. 16, 2016 | Out.java |
| 4452 | Jun. 16, 2016 | Particle.java |
| 10209 | Jun. 16, 2016 | Picture.java |
| 1333 | Jun. 16, 2016 | PictureDump.java |
| 11084 | Jun. 16, 2016 | Point2D.java |
| 5562 | Jun. 16, 2016 | PolynomialRegression.java |
| 7171 | Jun. 16, 2016 | PrimMST.java |
| 1056 | Jun. 16, 2016 | Queue$ListIterator.class |
| 437 | Jun. 16, 2016 | Queue$Node.class |
| 2806 | Jun. 16, 2016 | Queue.class |
| 5119 | Jun. 16, 2016 | Queue.java |
| 5419 | Jun. 16, 2016 | Quick.java |
| 3463 | Jun. 16, 2016 | Quick3string.java |
| 3791 | Jun. 16, 2016 | Quick3way.java |
| 3849 | Jun. 16, 2016 | QuickFindUF.java |
| 3903 | Jun. 16, 2016 | QuickUnionUF.java |
| 5080 | Jun. 16, 2016 | QuickX.java |
| 4155 | Jun. 16, 2016 | RabinKarp.java |
| 1942 | Jun. 16, 2016 | RandomSeq.java |
| 18796 | Jun. 16, 2016 | RedBlackBST.java |
| 3393 | Jun. 16, 2016 | ResizingArrayBag.java |
| 5324 | Jun. 16, 2016 | ResizingArrayQueue.java |
| 4868 | Jun. 16, 2016 | ResizingArrayStack.java |
| 1970 | Jun. 16, 2016 | RunLength.java |
| 9780 | Jun. 16, 2016 | SET.java |
| 7983 | Jun. 16, 2016 | ST.java |
| 4434 | Jun. 16, 2016 | Selection.java |
| 4147 | Jun. 16, 2016 | SeparateChainingHashST.java |
| 5934 | Jun. 16, 2016 | SequentialSearchST.java |
| 3861 | Jun. 16, 2016 | Shell.java |
| 10062 | Jun. 16, 2016 | Simplex.java |
| 3650 | Jun. 16, 2016 | SparseVector.java |
| 1056 | Jun. 16, 2016 | Stack$ListIteratorclass |
| 437 | Jun. 16, 2016 | Stack$Node.class |
| 2686 | Jun. 16, 2016 | Stack.class |
| 5172 | Jun. 16, 2016 | Stack.java |
| 2528 | Jun. 16, 2016 | StaticSETofInts.java |
| 6485 | Jun. 16, 2016 | StdArray10.java |
| 9466 | Jun. 16, 2016 | StdAudio.java |
| 42008 | Jun. 16, 2016 | StdDraw.java |
| 157753 | Jun. 16, 2016 | StdDraw3D.java |
| 5580 | Jun. 16, 2016 | StdIn.class |
| 13533 | Jun. 16, 2016 | StdIn.java |
| 13752 | Jun. 16, 2016 | StdInTestjava |
| 2804 | Jun. 16, 2016 | StdOut.class |
| 5694 | Jun. 16, 2016 | StdOut.java |
| 5585 | Jun. 16, 2016 | StdRandom.class |
| 12304 | Jun. 16, 2016 | StdRandom.java |
| 10580 | Jun. 16, 2016 | StdStats.java |
| 896 | Jun. 16, 2016 | Stopwatch.java |
| 1239 | Jun. 16, 2016 | StopwatchCPU.java |

-continued

| Size | Creation Date | File Name |
|---|---|---|
| 7835 | Jun. 16, 2016 | SuffixArray.java |
| 9221 | Jun. 16, 2016 | SuffixArrayX.java |
| 4748 | Jun. 16, 2016 | SymbolDigraph.java |
| 5942 | Jun. 16, 2016 | SymbolGraph.java |
| 5689 | Jun. 16, 2016 | TST.java |
| 5334 | Jun. 16, 2016 | TarjanSCC.java |
| 213 | Jun. 16, 2016 | Test.java |
| 3338 | Jun. 16, 2016 | ThreeSum.java |
| 4036 | Jun. 16, 2016 | ThreeSumFast.java |
| 2523 | Jun. 16, 2016 | TopM.java |
| 3997 | Jun. 16, 2016 | Topological.java |
| 6654 | Jun. 16, 2016 | Transaction.java |
| 1308 | Jun. 16, 2016 | TransitiveClosure.class |
| 3611 | Jun. 16, 2016 | TransitiveClosure.java |
| 9176 | Jun. 16, 2016 | TrieSET.java |
| 10224 | Jun. 16, 2016 | TrieST.java |
| 7644 | Jun. 16, 2016 | UF.java |
| 4294 | Jun. 16, 2016 | UnicodeTest.java |
| 6832 | Jun. 16, 2016 | Vector.java |
| 4349 | Jun. 16, 2016 | WeightedQuickUnionUF.java |
| 1764 | Jun. 16, 2016 | WhiteFilter.java |
| 1961 | Jun. 16, 2016 | Whitelist.java |
| 158 | Jun. 16, 2016 | make_java_executables |
| 632 | Jun. 16, 2016 | program_tests |
| 5478 | Jun. 16, 2016 | testBipartiteMatching.java |
| 2829 | Jun. 16, 2016 | testGreedyPacking.java |

Two MATLAB data files are included. They are:

| Size | Creation Date | File Name |
|---|---|---|
| 12820688 | Jul. 6, 2020 | loc_metadata.mat |
| 14131168 | Jul. 6, 2020 | simulate_sbe_2d_analytical_mat_2.mat |

The disclosure here contemplates implementing the disclosed techniques with a computer. The method is disclosed as a process, but the disclosed techniques can be programmed in computer code as a set of computer instructions. Even if programmed on a general-purpose computer, such a computer should be considered non-generic and special-purpose once adapted because of the presence of specific programmed computer instructions, which control at least one computer processor and cause it to perform the functions described herein. Alternative instantiations can be accomplished equivalently with dedicated special-purpose computers or dedicated computer appliances, rather than program-adapted general-purpose computing machines. Either way, the specially programmed or structured computer comprises an improved computing machine that accomplishes functions not possible with computers not so constructed or adapted.

Computer instructions (e.g., computer software, if used in lieu of hardware-wired machines), can be stored in any tangible, non-transient, temporary or permanent computer memory, digital storage, or replaceable media accessible to the computer or encoded in computer hardware, such as by including programming in microcode, machine code, network-based or web-based or distributed software modules that operate together, RAM, ROM, CD-ROM, CD-R, CD-R/W, DVD-ROM, DVD±R, DVD±R/W, hard drives, thumb drives, flash memory, optical media, magnetic media, semiconductor media, or any future computer-readable storage alternatives. The data on which the examples operate can be stored in the same or a different computer memory, storage, or media accessible to the computer, of any one or more of the types listed above.

References to "a computer" or "computer" (or simply references to computer-programmed operations, computations, or calculations) should be understood to allow for implementation on either a single computer or on multiple computers, such as a system of interconnected devices, or a set of devices using distributed processing techniques. Each computer device, also, may utilize one or more processors.

The word "step" is intended to refer to computer operations or acts, or phases, in the case of a method, or computer equipment programmed to perform such operations or acts, in the case of an apparatus. The word is not intended as having any special legal meaning.

The disclosure here focuses on a method or process, but the disclosure should be understood to refer equally to equipment or apparatus, such as a computer, that implements such methods or processes, as well as to computer instructions stored in tangible media (that is not a transitory propagating signal) that control a computer to implement such methods or processes.

In addition to the preceding examples, the following examples fall within the scope of the present disclosure:

Example 1

A method implemented using a programmed computerized machine, the method comprising: (a) for each one of a set of sonic events, the sonic events of the set arising from an unknown number of sonic sources of a specified class of sonic sources, one or more of which sonic sources are in motion with respect to at least one receiver, using the machine, determining a corresponding temporal statistical characterization for a corresponding event time and a corresponding spatial statistical characterization for a corresponding event position; (b) for each pairing of two different sonic events of the set, using the machine, classifying that pairing as comparable only when that pairing meets a set of one or more preselected constraints, at least some of which constraints depend on the temporal statistical characterizations and the spatial statistical characterizations; and (c) using the machine, estimating a minimum number of sonic sources that could have generated the sonic events by (i) determining a number of sonic events in a longest antichain within a chronological ordering of the set of sonic events, wherein an antichain comprises a corresponding subset of the sonic events for which no pairing of two different sonic events of that subset is a comparable pairing, and (ii) equating the estimated minimum number of acoustic sources to the number of acoustic events in the longest antichain.

Example 2

The method of Claim 1 wherein determining the number of sonic events in the longest antichain includes (i) generating an adjacency matrix ordered according to the chronologically ordered set of the sonic events and including indicia denoting whether pairings of the sonic events are comparable, and (ii) calculating a maximum matching of a bipartite graph that is a conversion of the adjacency matrix.

Example 3

The method of any one of Examples 1 or 2 wherein determining the number of sonic events in the longest antichain includes generating the distinct chains from the maximum matching, determining a minimum number of distinct chains into which the entire set of sonic events can be partitioned, and equating the minimum number of chains to the number of sonic events in the longest antichain, wherein every pairing of two different sonic events of a given chain is classified as comparable.

Example 4

The method of any one of Examples 1 through 3 further comprising generating a first set of distinct paths, each of the paths denoting an estimated path for one of the estimated minimum number of corresponding sonic sources that, together with the other sonic sources of the estimated minimum number of the sonic sources, could have produced the sonic events, by partitioning the set of sonic events into a first set of disjoint chains, each chain comprising a subset of the sonic events corresponding to one of the paths and including one and only one corresponding sonic event from a first selected longest antichain, wherein every pairing of two different sonic events of a given chain of the first set is classified as comparable.

Example 5

The method of Example 4 further comprising generating a second set of distinct paths, each of the paths denoting an estimated path for one of the estimated minimum number of corresponding sonic sources that, together with the other sonic sources of the estimated minimum number of the sonic sources, could have produced the sonic events, by partitioning the set of sonic events into a second set of disjoint chains, each chain comprising a subset of the sonic events corresponding to one of the paths and including one and only one corresponding sonic event from a second selected longest antichain that is different from the first selected longest antichain, wherein every pairing of two different sonic events of a given chain of the second set is classified as comparable.

Example 6

The method of any one of Examples 4 or 5 wherein the method further comprises repeating the generation of the first or second sets of distinct paths using one or both of (i) one or more altered spatial or temporal confidence intervals or (ii) an altered set of one or more preselected constraints.

Example 7

The method of any one of Examples 1 through 6 wherein the method further comprises repeating parts (a) through (c) using one or both of (i) one or more altered spatial or temporal confidence intervals or (ii) an altered set of one or more preselected constraints.

Example 8

The method of any one of Examples 1 through 7 wherein (i) the set of one or more preselected constraints includes one or more probability distributions, or probability information, characterizing behavior of the sonic sources, and (ii) estimating the minimum number of sonic sources includes determining at least some characteristics of a probability distribution of the number of sonic events in a longest antichain.

Example 9

The method of any one of Examples 1 through 8 wherein the set of one or more preselected constraints includes a maximum speed constraint.

Example 10

The method of any one of Examples 1 through 9 wherein the set of one or more preselected constraints includes a minimum-separation-time constraint.

Example 11

The method of any one of Examples 1 through 10 wherein the set of one or more preselected constraints includes the constraint that, for each pairing classified as comparable, either (i) the corresponding spatial confidence intervals overlap, or (ii) a minimum distance between the corresponding non-overlapping spatial confidence intervals, divided by a maximum time span encompassed by the corresponding temporal confidence intervals, is less than or equal to a preselected maximum speed of sonic sources of the specified class.

Example 12

The method of any one of Examples 1 through 11 wherein the set of one or more preselected constraints further includes, for each pairing classified as comparable, one or more of (i) a maximum distance encompassed by the corresponding spatial confidence intervals, divided by a minimum time span encompassed by the corresponding temporal confidence intervals, is greater than or equal to a preselected minimum speed of sonic sources of the specified class, (ii) a time span separating the corresponding temporal confidence intervals being greater than a preselected minimum time between sonic events for sonic sources of the specified class, or (iii) a corresponding turning rate being less than a preselected maximum turning rate for sonic sources of the specified class.

Example 13

The method of any one of Examples 1 through 12 further comprising creating the chronological ordering of the sonic events by ordering the sonic events according to one or more parameters selected from: (i) corresponding earlier bounds of the corresponding temporal confidence intervals, (ii) corresponding later bounds of the corresponding temporal confidence intervals, (iii) corresponding centers of the corresponding temporal confidence intervals, (iv) peak position of a probability distribution, (v) centroid of a probability distribution, or (vi) first moment of a probability distribution.

Example 14

The method of any one of Examples 1 through 13 further comprising creating at least a portion of the chronological ordering by randomly or arbitrarily selecting relative chronological order among one or more sonic events for which ordering according to the corresponding temporal confidence intervals is indeterminate.

Example 15

The method of any one of Examples 1 through 14 wherein the specified class of sonic sources includes one or more specified species of animal (where the species may include humans), and the sonic events are intermittently received sounds produced by animals of the one or more specified species.

Example 16

The method of Example 15 wherein the specified class of sonic sources includes one or more specified species of marine, amphibious, or aquatic animal and the intermittently received sounds are calls of a specified type.

Example 17

The method of Example 16 wherein the specified class of sonic sources includes one or more specified species of marine mammal.

Example 18

The method of Example 17 wherein the specified class of sonic sources includes only a single specified species of whale, bird, frog, or fish.

Example 19

The method of any one of Examples 1 through 14 wherein the specified class of sonic sources includes one or more specified types of marine or aquatic vessel, and the sonic events comprise a specified type of sound intermittently received from vessels of the one or more specified types.

Example 20

The method of any one of Examples 1 through 14 wherein the specified class of sonic sources includes one or more specified types of land vehicle, and the sonic events comprise a specified type of sound intermittently received from vehicles of the one or more specified types.

Example 21

The method of any one of Examples 1 through 14 wherein the specified class of sonic sources includes one or more specified types of aircraft, and the sonic events comprise a specified type of sound intermittently received from aircraft of the one or more specified types.

Example 22

The method of any one of Examples 1 through 14 wherein the specified class of sonic sources includes one or more specified types of land-based, shipboard, or airborne weaponry, and the sonic events comprise a specified type of sound intermittently received from weaponry of the one or more specified types.

Example 23

The method of any one of Examples 1 through 14 wherein the specified class of sonic sources includes one or more specified types of human-carried equipment, and the sonic events comprise a specified type of sound intermittently received from equipment of the one or more specified types.

Example 24

A programmed computerized machine comprising one or more electronic processors and one or more tangible computer-readable storage media operationally coupled to the one or more processors, the machine being structured and programmed to perform the method of any one of Examples 1 through 23.

Example 25

An article comprising a tangible medium that is not a propagating signal encoding computer-readable instructions that, when applied to a computerized machine, program the computerized machine to perform the method of any one of Examples 1 through 23.

It is intended that equivalents of the disclosed example apparatus and methods shall fall within the scope of the present disclosure. It is intended that the disclosed example apparatus and methods, and equivalents thereof, may be modified.

The examples described herein group various features (including method steps or acts) together for the purpose of streamlining the disclosure. This method of disclosure is not to be interpreted as reflecting an intention that any particular example requires each and every feature recited. Nor is the term "example" intended to refer to a necessary combination of features. The term "example" is not intended to reflect exclusion of features discussed in connection with different examples or with no specific example at all. Nor is any feature to be considered "essential" or "necessary" to any particular or all examples, unless explicitly stated.

Rather, it is contemplated that any particular feature or group of features discussed herein can be isolated from other features, even if disclosed in connection with a particular "example" having additional features. In addition, a feature or group of features from one example can be combined with features discussed elsewhere (unless clearly and necessarily inconsistent). The present disclosure shall be understood, therefore, as disclosing any example having any suitable set of one or more features (i.e., a set of features that are neither incompatible nor mutually exclusive) that appear in (including via incorporation) the present disclosure, including combinations of features that may not be explicitly disclosed in a particular example combination.

For purposes of this disclosure, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of this disclosure, words "comprising," "including," "having," and variants thereof, wherever they appear, shall be construed as open-ended terminology, with the same meaning as if the phrase "at least" were appended after each instance thereof.

Any labelling of elements, steps, limitations, or other portions (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited (unless an order is implicitly or inherently required by virtue of an explicitly recited sequence, such as one stated feature explicitly depending on an earlier one).

The Abstract is provided as required as an aid to those searching for specific subject matter within the patent literature. However, the Abstract is not intended to imply that any elements, features, or limitations recited therein are necessary.

What is claimed is:

1. A method implemented using a programmed computerized machine, the method comprising:
   (a) for each one of a set of sonic events, the sonic events of the set arising from an unknown number of sonic sources of a specified class of sonic sources, one or more of which sonic sources are in motion with respect to at least one receiver, using the machine, determining a corresponding temporal statistical characterization for a corresponding event time and a corresponding spatial statistical characterization for a corresponding event position;
   (b) for each pairing of two different sonic events of the set, using the machine, classifying that pairing as comparable only when that pairing meets a set of one or more preselected constraints, at least some of which constraints depend on the temporal statistical characterizations and the spatial statistical characterizations; and
   (c) using the machine, estimating a minimum number of sonic sources that could have generated the sonic events by (i) determining a number of sonic events in a longest antichain within a chronological ordering of the set of sonic events, wherein an antichain comprises a corresponding subset of the sonic events for which no pairing of two different sonic events of that subset is a comparable pairing, and (ii) equating the estimated minimum number of acoustic sources to the number of acoustic events in the longest antichain.

2. The method of claim 1 wherein determining the number of sonic events in the longest antichain includes (i) generating an adjacency matrix ordered according to the chronologically ordered set of the sonic events and including indicia denoting whether pairings of the sonic events are comparable, and (ii) calculating a maximum matching of a bipartite graph that is a conversion of the adjacency matrix.

3. The method of claim 1 wherein determining the number of sonic events in the longest antichain includes determining a minimum number of distinct chains into which the entire set of sonic events can be partitioned, and equating the minimum number of chains to the number of sonic events in the longest antichain, wherein every pairing of two different sonic events of a given chain is classified as comparable.

4. The method of claim 1 further comprising generating a first set of distinct paths, each of the paths denoting an estimated path for one of the estimated minimum number of corresponding sonic sources that, together with the other sonic sources of the estimated minimum number of the sonic sources, could have produced the sonic events, by partitioning the set of sonic events into a first set of disjoint chains, each chain comprising a subset of the sonic events corresponding to one of the paths and including one and only one corresponding sonic event from a first selected longest antichain, wherein every pairing of two different sonic events of a given chain of the first set is classified as comparable.

5. The method of claim 1 wherein (i) the set of one or more preselected constraints includes probability information characterizing behavior of the sonic sources, and (ii) estimating the minimum number of sonic sources includes determining at least some characteristics of a probability distribution of the number of sonic events in a longest antichain.

6. The method of claim 1 wherein the set of one or more preselected constraints includes a maximum speed constraint.

7. The method of claim 1 wherein the set of one or more preselected constraints includes a minimum-separation-time constraint.

8. The method of claim 1 wherein the specified class of sonic sources includes one or more specified species of animal, and the sonic events are intermittently received sounds produced by animals of the one or more specified species.

9. The method of claim 8 wherein the specified class of sonic sources includes one or more specified species of marine or aquatic animal and the intermittently received sounds are calls of a specified type.

10. The method of claim 9 wherein the specified class of sonic sources includes only a single specified species of whale.

11. The method of claim 1 wherein the specified class of sonic sources includes one or more specified types of weaponry, and the sonic events comprise a specified type of sound intermittently received from weaponry of the one or more specified types.

12. The method of claim 1 wherein the specified class of sonic sources includes one or more specified types of human-carried equipment, and the sonic events comprise a specified type of sound intermittently received from equipment of the one or more specified types.

13. A programmed computerized machine comprising one or more electronic processors and one or more tangible computer-readable storage media operationally coupled to the one or more processors, the computerized machine being structured and programmed to perform a method comprising:
  (a) for each one of a set of sonic events, the sonic events of the set arising from an unknown number of sonic sources of a specified class of sonic sources, one or more of which sonic sources are in motion with respect to at least one receiver, with the computerized machine, determining a corresponding temporal statistical characterization for a corresponding event time and a corresponding spatial statistical characterization for a corresponding event position;
  (b) for each pairing of two different sonic events of the set, with the computerized machine, classifying that pairing as comparable only when that pairing meets a set of one or more preselected constraints, at least some of which constraints depend on the temporal statistical characterizations and the spatial statistical characterizations; and
  (c) with the computerized machine, estimating a minimum number of sonic sources that could have generated the sonic events by (i) determining a number of sonic events in a longest antichain within a chronological ordering of the set of sonic events, wherein an antichain comprises a corresponding subset of the sonic events for which no pairing of two different sonic events of that subset is a comparable pairing, and (ii) equating the estimated minimum number of acoustic sources to the number of acoustic events in the longest antichain.

14. The computerized machine of claim 13 wherein the computerized machine is structured and programmed to determine the number of sonic events in the longest antichain by (i) generating an adjacency matrix ordered according to the chronologically ordered set of the sonic events and including indicia denoting whether pairings of the sonic events are comparable, and (ii) calculating a maximum matching of a bipartite graph that is a conversion of the adjacency matrix.

15. The computerized machine of claim 13 wherein the computerized machine is structured and programmed to determine the number of sonic events in the longest antichain by determining a minimum number of distinct chains into which the entire set of sonic events can be partitioned, and equating the minimum number of chains to the number of sonic events in the longest antichain, wherein every pairing of two different sonic events of a given chain is classified as comparable.

16. The computerized machine of claim 13 where the computerized machine is further structured and programmed to generate a first set of distinct paths, each of the paths denoting an estimated path for one of the estimated minimum number of corresponding sonic sources that, together with the other sonic sources of the estimated minimum number of the sonic sources, could have produced the sonic events, by partitioning the set of sonic events into a first set of disjoint chains, each chain comprising a subset of the sonic events corresponding to one of the paths and including one and only one corresponding sonic event from a first selected longest antichain, wherein every pairing of two different sonic events of a given chain of the first set is classified as comparable.

17. The computerized machine of claim 13 wherein (i) the set of one or more preselected constraints includes probability information characterizing behavior of the sonic sources, and (ii) the computerized machine is structured and programmed to estimate the minimum number of sonic sources by determining at least some characteristics of a probability distribution of the number of sonic events in a longest antichain.

18. An article comprising a tangible medium that is not a propagating signal encoding computer-readable instructions that, when applied to a computerized machine, program the computerized machine to perform a method comprising:
  (a) for each one of a set of sonic events, the sonic events of the set arising from an unknown number of sonic sources of a specified class of sonic sources, one or more of which sonic sources are in motion with respect to at least one receiver, with the computerized machine, determining a corresponding temporal statistical characterization for a corresponding event time and a corresponding spatial statistical characterization for a corresponding event position;
  (b) for each pairing of two different sonic events of the set, with the computerized machine, classifying that pairing as comparable only when that pairing meets a set of one or more preselected constraints, at least some of which constraints depend on the temporal statistical characterizations and the spatial statistical characterizations; and
  (c) with the computerized machine, estimating a minimum number of sonic sources that could have generated the sonic events by (i) determining a number of sonic events in a longest antichain within a chronological ordering of the set of sonic events, wherein an antichain comprises a corresponding subset of the sonic events for which no pairing of two different sonic events of that subset is a comparable pairing, and (ii) equating the estimated minimum number of acoustic sources to the number of acoustic events in the longest antichain.

19. The article of claim 18 wherein the instructions cause the computerized machine to determine the number of sonic events in the longest antichain by (i) generating an adjacency matrix ordered according to the chronologically ordered set of the sonic events and including indicia denoting whether pairings of the sonic events are comparable, and (ii) calculating a maximum matching of a bipartite graph that is a conversion of the adjacency matrix.

20. The article of claim 18 wherein the instructions cause the computerized machine to determine the number of sonic events in the longest antichain by determining a minimum number of distinct chains into which the entire set of sonic events can be partitioned, and equating the minimum number of chains to the number of sonic events in the longest antichain, wherein every pairing of two different sonic events of a given chain is classified as comparable.

21. The article of claim 18 further comprising the instructions cause the computerized machine to generate a first set of distinct paths, each of the paths denoting an estimated path for one of the estimated minimum number of corresponding sonic sources that, together with the other sonic sources of the estimated minimum number of the sonic sources, could have produced the sonic events, by partitioning the set of sonic events into a first set of disjoint chains, each chain comprising a subset of the sonic events corresponding to one of the paths and including one and only one corresponding sonic event from a first selected longest antichain, wherein every pairing of two different sonic events of a given chain of the first set is classified as comparable.

22. The article of claim 18 wherein (i) the set of one or more preselected constraints includes one or more probability distributions characterizing behavior of the sonic sources, and (ii) the instructions cause the computerized machine to estimate the minimum number of sonic sources by determining at least some characteristics of a probability distribution of the number of sonic events in a longest antichain.

* * * * *